United States Patent
Hu et al.

(10) Patent No.: US 11,711,731 B2
(45) Date of Patent: Jul. 25, 2023

(54) DATA TRANSMISSION METHOD AND APPARATUS

(71) Applicant: HUAWEI TECHNOLOGIES CO., LTD., Shenzhen (CN)

(72) Inventors: Xingxing Hu, Shanghai (CN); Qinghai Zeng, Shanghai (CN); Rui Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 344 days.

(21) Appl. No.: 17/186,030

(22) Filed: Feb. 26, 2021

(65) Prior Publication Data
US 2021/0185569 A1 Jun. 17, 2021

Related U.S. Application Data

(63) Continuation of application No. PCT/CN2019/102761, filed on Aug. 27, 2019.

(30) Foreign Application Priority Data

Aug. 28, 2018 (CN) .......................... 201810989663.9

(51) Int. Cl.
*H04W 4/00* (2018.01)
*H04W 36/00* (2009.01)
(Continued)

(52) U.S. Cl.
CPC ....... *H04W 36/0022* (2013.01); *H04L 5/0058* (2013.01); *H04W 36/08* (2013.01); *H04W 36/14* (2013.01)

(58) Field of Classification Search
CPC . H04W 36/0022; H04W 36/08; H04W 36/14; H04W 36/0066; H04W 92/20;
(Continued)

(56) References Cited

U.S. PATENT DOCUMENTS 8,818,375 B2* 8/2014 Meyer .................. H04L 5/0055
455/436

FOREIGN PATENT DOCUMENTS

CN 102271373 A 12/2011
CN 103582054 A 2/2014
(Continued)

OTHER PUBLICATIONS

Ericsson, TP for BL CR for 38.300 for intra- and inter-system HO. 3GPP TSG-RAN WG3 NR AH 1807 Meeting, Montreal, Canada, Jul. 2, 2018, R3-184064, 6 pages.
(Continued)

*Primary Examiner* — Marcos Batista
(74) *Attorney, Agent, or Firm* — Rimon PC

(57) ABSTRACT

A data transmission method and apparatus are disclosed. The method includes: determining, by a source base station of a terminal in a handover process, first data and a radio air interface protocol sequence number of a data unit used to carry the first data, where the first data includes data that is not acknowledged by a terminal for correct reception during data transmission between the source base station and the terminal. The method further includes sending, by the source base station, the first data and the radio air interface protocol sequence number to a target base station; where the core network connected to the target base station is different from the core network connected to the source base station.

17 Claims, 13 Drawing Sheets

(51) Int. Cl.
  *H04L 5/00* (2006.01)
  *H04W 36/08* (2009.01)
  *H04W 36/14* (2009.01)
(58) Field of Classification Search
  CPC . H04W 36/125; H04W 36/023; H04W 24/04; H04L 5/0058
  USPC .................................. 370/331; 455/436–437
  See application file for complete search history.

(56) References Cited

FOREIGN PATENT DOCUMENTS

| | | | |
|---|---|---|---|
| CN | 104301955 | A | 1/2015 |
| CN | 104509161 | A | 4/2015 |
| CN | 104935452 | A | 9/2015 |
| CN | 105635989 | A | 6/2016 |
| CN | 108024294 | A | 5/2018 |
| WO | 0189251 | A1 | 11/2001 |
| WO | 2018128494 | A1 | 7/2018 |

OTHER PUBLICATIONS

Ericsson, Data Forwarding Common Aspects. 3GPP TSG-RAN WG3 NR AH 1807 Meeting, Montreal, Canada, Jul. 2, 2018, R3-184063, 8 pages.
Huawei, Principles of Data Forwarding. 3GPP TSG-RAN WG3#99, Athens, Greece, Feb. 26, 2018, R3-181028, 4 pages.
Samsung, KT Corp., Data forwarding for Inter-system handover from EPS to 5GS. 3GPP TSG-RAN WG3 NR Adhoc 1801, Sophia Antipolis, France, Jan. 22, 2018, R3-180249, 13 pages.
3GPP TS 36.323 V15.0.0 (Jul. 2018), 3rd Generation Partnership Project; Technical Specification Group Radio Access Network; Evolved Universal Terrestrial Radio Access (E-UTRA); Packet Data Convergence Protocol (PDCP) specification(Release 15), 51 pages.
3GPP TS 36.300 V15.2.0 (Jul. 2018), 3rd Generation Partnership Project; Technical Specification; LTE; Evolved Universal Terrestrial Radio Access (E-UTRA) and Evolved Universal Terrestrial Radio Access Network (E-UTRAN) Overall description; Stage 2(Release 15), ETSI TS 136 300 v15.2.0; 375 pages.

* cited by examiner

DATA TRANSMISSION METHOD AND APPARATUS

CROSS-REFERENCE TO RELATED APPLICATIONS

This application is a continuation of International Application No. PCT/CN2019/102761, filed on Aug. 27, 2019, which claims priority to Chinese Patent Application No. 201810989663.9, filed on Aug. 28, 2018. The disclosures of the aforementioned applications are hereby incorporated by reference in their entireties.

TECHNICAL FIELD

This application relates to the field of communications technologies, and in particular, to a data transmission method and apparatus.

BACKGROUND

With development of communications technologies, more terminals need to access a wireless network, and more services need a guaranteed high rate. These impose a higher throughput requirement on a network. To meet this requirement, a new generation of wireless communications system, which may be referred to as a 5G communications system, is being studied in a standard. The wireless communications system includes a network side device and a terminal. The network device includes a base station and a core network. The terminal completes a wireless communication task by interacting with the network side.

In a 4G communications system, a wireless communications technology between a base station and a terminal is referred to as long term evolution (LTE), a corresponding base station is referred to as an LTE evolved NodeB (eNB), and a core network is referred to as an evolved packet core (EPC). In a 5G communications system, a wireless communications technology between a base station and a terminal is referred to as new radio (NR), a corresponding base station is referred to as a gNB, and a core network is referred to as a 5GC (5 generation core). To enable independent evolution of a base station and a core network, in a wireless communications standard, an eNB is allowed to connect to a 4G core network EPC (that is, a terminal is connected to the EPC by using the LTE eNB), and the eNB is also allowed to connect to a core network 5GC in a 5G system. A corresponding base station may be referred to as an evolved long term evolution (eLTE) eNB, which is also referred to as an ng-eNB. In addition, the eLTE eNB is also allowed to connect to both the EPC and the 5GC, or one cell can be connected to both the EPC and the 5GC.

When the terminal is connected to the EPC using the LTE eNB base station, communication data between the base station and the terminal may be processed by using a wireless protocol at each layer of LTE, for example, an LTE packet data convergence protocol (PDCP)/LTE radio link control (RLC)/LTE medium access control (MAC)/LTE physical (PHY). When the terminal is connected to the 5GC using the base station gNB, communication data between the base station and the terminal may use a wireless protocol standard at each layer of NR, for example, an NR service data adaptation protocol (SDAP)/NR PDCP/NR RLC/NR MAC/NR PHY. When the terminal is connected to the 5GC by using the base station ng-eNB, communication data between the base station and the terminal may comprehensively use a wireless protocol standard at each layer of NR/LTE, for example, NR SDAP/NR PDCP/LTE RLC/LTE MAC/LTE PHY. When the terminal communicates with the base station, some services require data packets to be submitted in sequence (that is, the data packets need to be sent to a peer end based on a sequence relationship; for example, when the base station receives data from the terminal, the base station needs to submit the data to the core network based on a specific sequence relationship). In communication between the base station and the terminal, a transmit end usually allocates a sequence number to a data packet in some wireless protocols, so that a receive end can determine whether the data packet is out of order based on the sequence relationship of the sequence number.

An operator may deploy an LTE base station in some areas, and an eLTE base station in some other areas, and a handover between corresponding core networks needs to be performed when the terminal moves from the LTE eNB to the eLTE eNB. Alternatively, in a scenario in which the base station is connected to both the EPC and the 5GC, considering load balancing of the core network, some terminals need to be handed over between the EPC and the 5GC. Alternatively, a corresponding handover is required when the terminal moves from the LTE eNB to the gNB. When the terminal is connected to different core networks, different protocols are used for radio bearers between the base station and the terminal, which may lead to a data loss and out-of-order submission.

For example, when a terminal connected to the EPC by using the LTE base station is handed over to the NR base station connected to the 5GC, for downlink data, a source cell forwards downlink data that is not correctly received by the terminal to a source core network, the source core network transmits the downlink data to the terminal by using a target core network and a target cell, and the target cell allocates a sequence number to the downlink data again. During the handover, a wireless protocol layer of the terminal submits data received from the source cell to an upper layer, and then receives the data in the target cell. When data is not correctly received, it may be a case that only particular data packets in some data packets are not received by the terminal. For example, data packets from the source core network are in a sequence of data packets 1, 2, 3, 4, and 5. Data packets 1, 3, and 5 are correctly received by the terminal, and data packets 2 and 4 are not correctly received by the terminal. In this case, during the handover, the wireless protocol layer of the terminal submits the data packets 1, 3, and 5 to the upper layer, and then submits the data packets 2 and 4 received from the target cell to the upper layer. As a result, the data packets 1, 2, 3, 4, and 5 received by the upper layer are out of order.

SUMMARY

This application provides a data transmission method and apparatus, so as to ensure that a data packet is not lost in a communication process between a terminal and a base station and multiple received data packets can be submitted in sequence.

According to a first aspect, this application provides a data transmission method, where the method includes: A source base station of a terminal in a handover process determines first data and a radio air interface protocol sequence number, such as an SN number, of a data unit used to carry the first data, where the first data includes data that is not acknowledged by a terminal for correct reception during data transmission between the source base station and the terminal; and the source base station sends the first data and the radio air interface protocol sequence number to a target base station of a terminal in a handover process; where a core network connected to the target base station is different from a core network connected to the source base station, and the source base station and the target base station are a source base station and a target base station of the terminal in a handover process between different core networks.

In this method, the source base station sends, to the target base station, the data that is not acknowledged by the terminal for correct reception during data transmission between the source base station and the terminal, and the data unit corresponding to the data carries a radio air interface sequence number, so that after receiving a data packet that carries an original radio air interface sequence number, the target base station sends the sequence numbers and the data packets to the terminal. Because these radio air interface sequence numbers and the data packet that is correctly received by the terminal previously are sorted based on a same rule and sequence, the terminal can correctly sort the received data packets, thereby ensuring that all the received data packets are submitted to an upper layer in sequence.

Optionally, with reference to the first aspect, in a possible implementation of the first aspect, the method further includes: The source base station determines second data, where the second data includes data that is received by the source base station from a source core network in a handover process of the terminal between core networks and that is to be sent to the terminal; and the source base station sends the second data to the target base station, so that the target base station continues to allocate, to the second data, a radio air interface protocol sequence number of a data unit of the second data based on the radio air interface protocol sequence number corresponding to the first data.

In this implementation, in the handover process of the terminal between core networks, the source base station sends, to the target base station, the generated second data and the radio air interface protocol sequence number corresponding to the second data. Because the radio air interface protocol sequence number corresponding to the second data is continuously configured based on the first data, the target base station and the terminal at a receive end can identify and correctly sort the received data packets, thereby ensuring that the received data packets are submitted in sequence.

Optionally, with reference to the first aspect, in another possible implementation of the first aspect, before the source base station sends the first data and the radio air interface protocol sequence number to the target base station, the method further includes: The source base station configures first radio bearer information for the terminal, where the first radio bearer information is used to establish a radio bearer between the source base station and the terminal; the source base station sends the first radio bearer information to the target base station; the source base station receives an acknowledgment message fed back by the target base station, where the acknowledgment message is used to indicate second radio bearer information between the target base station and the terminal; and the source base station sends the second radio bearer information to the terminal.

The first radio bearer information includes radio bearer configuration, and further, the radio bearer configuration includes a data radio bearer (DRB) identifier, NR PDCP configuration information and NR SDAP configuration information that are corresponding to the DRB. Further, the NR SDAP configuration information includes a mapping relationship, between a DRB and a QoS flow, that is configured by the source base station for the UE. In addition, the NR SDAP configuration information further includes at least one of the following: a PDU session ID carried by a DRB, whether an SDAP packet header is separately configured for SDAP uplink and downlink, and whether the DRB is a default DRB. In addition, the radio bearer configuration may further include DRB configuration configured by the source base station for the UE. The DRB configuration specifically includes a DRB identifier, PDCP information that is configured for the UE by the source base station corresponding to the DRB, and the like.

Optionally, with reference to the first aspect, in still another possible implementation of the first aspect, the acknowledgment message is further used to indicate third radio bearer information, the third radio bearer information is configuration information for configuring third data, and the third data is data received from a target core network of the target base station.

In this aspect, the third radio bearer information is fed back, so that the target base station can determine, based on the third radio bearer information, data that is used to carry data delivered by the target core network, and sort sequence numbers of newly delivered data based on a protocol rule of the target core network, thereby avoiding confusion with the first data and the second data, and further ensuring that the target base station receives and processes different data from the source base station and from the target core network in sequence.

Optionally, with reference to the first aspect, in still another possible implementation of the first aspect, that the source base station sends the first data and the radio air interface protocol sequence number to the target base station includes: The source base station sends, to the target base station through a first tunnel, the data that is in the first data and that is not acknowledged by the terminal for correct reception and the radio air interface protocol sequence number.

Optionally, with reference to the first aspect, in still another possible implementation of the first aspect, the first data further includes an out-of-order data packet received by the source base station from the terminal; and that the source base station sends the first data and the radio air interface protocol sequence number to the target base station includes: The source base station sends, to the target base station through a second tunnel, the out-of-order data packet from the terminal in the first data and a radio air interface protocol sequence number corresponding to the out-of-order data packet.

In this implementation, for uplink data, the terminal sends an uplink out-of-order data packet and a corresponding sequence number to the target cell or the target base station, so as to prevent some data packets that are sent but not received by the source base station or the source cell from being lost.

According to a second aspect, this application further provides a data transmission method, where the method includes: A target base station receives first data and a radio air interface protocol sequence number from a source base station, where the first data includes data that is not acknowledged by a terminal for correct reception during data transmission between the source base station and the terminal, and the radio air interface protocol sequence number is a sequence number of a data unit that is determined by the source base station and that is used to carry the first data; and the target base station sends the first data and the radio air interface protocol sequence number to the terminal; where a core network connected to the target base station is different from a core network connected to the source base station, and the source base station and the target base station are a source base station and a target base station of the terminal in a handover process between different core networks.

Optionally, with reference to the second aspect, in a possible implementation of the second aspect, the method further includes: The target base station receives second data from the source base station, where the second data includes data that is received by the source base station from a source core network in a handover process of the terminal between core networks and that is to be sent to the terminal; the target base station continues to allocate, to the second data, a radio air interface protocol sequence number of a data unit of the second data based on the radio air interface protocol sequence number corresponding to the first data; and the target base station sends, to the terminal, the second data and the radio air interface protocol sequence number of the data unit of the second data.

Optionally, with reference to the second aspect, in still another possible implementation of the second aspect, before the target base station receives the first data and the radio air interface protocol sequence number from the source base station, the method further includes: The target base station receives first radio bearer information from the source base station, where the first radio bearer information is used to establish a radio bearer between the target base station and the terminal; the target base station determines second radio bearer information based on the first radio bearer information, and generates an acknowledgment message, where the acknowledgment message is used to indicate the second radio bearer information between the target base station and the terminal; and the target base station sends the acknowledgment message to the source base station.

Optionally, with reference to the second aspect, in still another possible implementation of the second aspect, the method further includes: The target base station determines third radio bearer information based on the first radio bearer information, where the third radio bearer information includes configuration information of a target core network connected to the target base station; and the target base station sends the third radio bearer information to the source base station by using the acknowledgment message.

Optionally, with reference to the second aspect, in still another possible implementation of the second aspect, the second radio bearer information includes a first radio bearer; and the target base station sends the first data and the radio air interface protocol sequence number to the terminal includes: The target base station sends, to the terminal by using the first radio bearer, the second data and the radio air interface protocol sequence number of the data unit of the second data.

Optionally, with reference to the second aspect, in still another possible implementation of the second aspect, the second radio bearer information includes a first radio bearer; and the target base station sends, to the terminal, the second data and the radio air interface protocol sequence number of the data unit of the second data includes: The target base station sends, to the terminal by using the first radio bearer, the second data and the radio air interface protocol sequence number of the data unit of the second data.

Optionally, with reference to the second aspect, in still another possible implementation of the second aspect, the method further includes: The target base station configures a second radio bearer based on the third radio bearer information; and the target base station sends third data to the terminal by using the second radio bearer, where the third data is data received by the target core network located in the target base station.

Optionally, with reference to the second aspect, in still another possible implementation of the second aspect, the method further includes: The target base station sends a handover complete message to the source base station, where the handover complete message includes an end marker, and the end marker is used to indicate the source core network to stop sending data to the source base station.

According to a third aspect, this application further provides a data transmission method, applied to a terminal, where the method includes: The terminal receives first data and a radio air interface protocol sequence number from a target base station, where the first data includes data that is not acknowledged by the terminal for correct reception during data transmission between a source base station and the terminal, and the radio air interface protocol sequence number is a sequence number of a data unit that is determined by the source base station and that is used to carry the first data; and the terminal sorts, based on the radio air interface protocol sequence number, the first data and data cached on the terminal; where a core network connected to the target base station is different from a core network connected to the source base station, and the source base station and the target base station are a source base station and a target base station of the terminal in a handover process between different core networks.

In this aspect, after the terminal receives the first data from the target core network, because the first data includes the sequence number of the data unit of the first data, such as an SN number, the terminal may sort the received first data and previously successfully received data based on the sequence number, so as to ensure that all data packets are sorted in a specific order, and finally, transmit the sorted data packets to an upper layer.

Optionally, with reference to the third aspect, in a possible implementation of the third aspect, the method further includes: The terminal receives, from the target base station, second data and a radio air interface protocol sequence number of a data unit of the second data, where the second data includes data that is received by the source base station from a source core network in a handover process of the terminal between core networks and that is to be sent to the terminal; and the terminal sorts the second data based on the radio air interface protocol sequence number of the data unit of the second data.

Optionally, with reference to the third aspect, in another possible implementation of the third aspect, the method further includes: The terminal receives, from the target base station, third data and a radio air interface protocol sequence number of a data unit of the third data, where the third data is data received from a target core network of the target base station; and the terminal sorts the third data based on the radio air interface protocol sequence number of the data unit of the third data.

Optionally, with reference to the third aspect, in still another possible implementation of the third aspect, before the terminal receives the first data and the radio air interface protocol sequence number from the target base station, the method further includes: The terminal receives a handover notification message from the source base station, where the handover notification message includes an identification (ID) of a target cell that accesses the target base station; and the terminal accesses the target cell based on the ID of the target cell, and sends a handover complete message to the target base station.

The handover notification message may be an RRC reconfiguration message.

Optionally, with reference to the third aspect, in still another possible implementation of the third aspect, the handover notification message further includes second radio bearer information, and the second radio bearer information includes a first radio bearer; and the first radio bearer DRB is used to transmit the first data that carriers an SN number and that is not acknowledged by the UE, and that the terminal receives the first data and the radio air interface protocol sequence number from the target base station includes: The terminal receives the first data and the radio air interface protocol sequence number of the data unit of the first data by using the first radio bearer.

Optionally, with reference to the third aspect, in still another possible implementation of the third aspect, the handover notification message further includes third radio bearer information, and the third radio bearer information includes a second radio bearer; the second radio bearer DRB is used to transmit a data packet that is handed over to the target core network, that is, the third data, and that the terminal receives the third data from the target base station includes: The terminal receives the third data and the radio air interface protocol sequence number of the data unit of the third data by using the second radio bearer.

According to a fourth aspect, this application further provides a data transmission apparatus, where the apparatus may be a source base station, and the apparatus includes a unit configured to perform the method steps in the first aspect and the various implementations of the first aspect.

Specifically, the apparatus includes a receiving unit, a processing unit, and a sending unit. In addition, the apparatus may further include another unit or module such as a storage unit.

According to a fifth aspect, this application further provides a data transmission apparatus, where the apparatus may be a target base station, and the apparatus includes a unit configured to perform the method steps in the second aspect and the various implementations of the second aspect.

Specifically, the apparatus includes a receiving unit, a processing unit, and a sending unit. In addition, the apparatus may further include another unit or module such as a storage unit.

According to a sixth aspect, this application further provides a data transmission apparatus, where the apparatus may be a terminal, and the apparatus includes a unit configured to perform the method steps in the third aspect and the various implementations of the third aspect.

Specifically, the apparatus includes a receiving unit, a processing unit, and a sending unit. In addition, the apparatus may further include another unit or module such as a storage unit.

According to a seventh aspect, at a specific hardware implementation level, this application further provides a network device, where the network device includes a processor, a transceiver, and a memory, and the network device may be a data transmission apparatus, for example, may be a source base station, a target base station, a source core network, a target core network, or a terminal.

Optionally, when the network device is a source base station, the processor is configured to determine first data and a radio air interface protocol sequence number of a data unit used to carry the first data, where the first data includes data that is not acknowledged by a terminal for correct reception during data transmission between the source base station and the terminal; and the transceiver is configured to send the first data and the radio air interface protocol sequence number to a target base station; where a core network connected to the target base station is different from a core network connected to the source base station, and the source base station and the target base station are a source base station and a target base station of the terminal in a handover process between different core networks.

In addition, the processor and the transceiver are further configured to implement functions in other various implementations of the first aspect.

Optionally, when the network device is a target base station, the transceiver is configured to receive first data and a radio air interface protocol sequence number from a source base station, where the first data includes data that is not acknowledged by a terminal for correct reception during data transmission between the source base station and the terminal, and the radio air interface protocol sequence number is a sequence number of a data unit that is determined by the source base station and that is used to carry the first data; and send the first data and the radio air interface protocol sequence number to the terminal; where a core network connected to the target base station is different from a core network connected to the source base station, and the source base station and the target base station are a source base station and a target base station of the terminal in a handover process between different core networks.

In addition, the processor and the transceiver are further configured to implement functions in other various implementations of the second aspect.

Optionally, when the network device is a terminal, the transceiver is configured to receive first data and a radio air interface protocol sequence number from a target base station, where the first data includes data that is not acknowledged by the terminal for correct reception during data transmission between a source base station and the terminal, and the radio air interface protocol sequence number is a sequence number of a data unit that is determined by the source base station and that is used to carry the first data; and the processor is configured to sort, based on the radio air interface protocol sequence number, the first data and data cached on the terminal; where a core network connected to the target base station is different from a core network connected to the source base station, and the source base station and the target base station are a source base station and a target base station of the terminal in a handover process between different core networks.

In addition, the processor and the transceiver are further configured to implement functions in other various implementations of the third aspect.

According to an eighth aspect, this application further provides a computer storage medium. The computer storage medium may be non-transitory or transitory. The computer storage medium may store a program, and when the program is executed, some or all of the steps in the embodiments of the data transmission method provided in the foregoing various aspects of this application may be performed.

According to a ninth aspect, this application further provides a computer program product, where the computer program product includes one or more computer instructions, such as a device upgrade instruction. When a computer loads and executes the computer program, some or all of the steps in the embodiments of the data transmission method provided in this application may be implemented.

According to a tenth aspect, this application further provides a data transmission system, where the system includes a source base station, a source core network, a target base station, a target core network, a terminal, and the like, the source base station may be the data transmission apparatus in the fourth aspect and the various implementations of the fourth aspect, the target base station may be the data transmission apparatus in the fifth aspect and the various implementations of the fifth aspect, the terminal may be the data transmission apparatus in the sixth aspect and the various implementations of the sixth aspect, the source core network may be an EPC, and the target core network may be a 5GC; or the source core network is a 5GC, and the target core network is an EPC.

According to an eleventh aspect, this application further provides another data transmission system, where the system includes a base station, a source core network, a target core network, a terminal, and the like. The base station is connected to both the source core network and the target core network, and is located in an area covered by the source core network and an area covered by the target core network. The base station has functions of the source base station and the target base station in the foregoing aspects.

The base station has two transmission ports to perform data transmission with the source core network and the target core network, respectively.

Optionally, for downlink transmission, the method includes: In a process of data transmission between the base station and the terminal UE, the base station first transmits, to the UE by using a radio bearer in fourth radio bearer information, a downlink PDCP SDU (such as fourth data) that is not acknowledged by the UE for correct reception before a core network is switched, and a sequence number corresponding to the fourth data. Then, the base station transmits, to the UE by using a radio bearer in fifth radio bearer information, new data (such as fifth data) from the target core network and a sequence number corresponding to the fifth data.

Optionally, for uplink transmission, the method includes: The UE resends, to the base station by using a radio bearer in fourth radio bearer information, these PDCP SDUs that are not acknowledged by the base station for correct reception; and sends a new data packet from an upper layer to the base station by using a radio bearer in fifth radio bearer information.

Optionally, with reference to the eleventh aspect, in a possible implementation of the eleventh aspect, the method includes: The UE first transmits an unsuccessfully sent PDCP SDU on a radio bearer in fourth radio bearer information; and then transmits a new data packet on a radio bearer in fifth radio bearer information after acknowledging that the PDCP SDU is correctly received by the base station.

Optionally, with reference to the eleventh aspect, in another possible implementation of the eleventh aspect, the method includes: The UE transmits an unsuccessfully sent PDCP SDU on a radio bearer in fourth radio bearer information, and transmits a new data packet on a radio bearer in fifth radio bearer information at the same time.

The base station establishes a communication connection to the source core network by using a first data transmission channel; and establishes a communication connection to the target core network by using a second data transmission channel.

Optionally, with reference to the eleventh aspect, in another possible implementation of the eleventh aspect, the method includes: The base station first receives data on a radio bearer in fourth radio bearer information, then sends the data on the radio bearer in the fourth radio bearer information to the source core network, and then sends data on a radio bearer in fifth radio bearer information to the target core network. After finishing sending the data, the base station sends a handover complete message to the target core network.

The base station establishes a communication connection to the source core network by using a third data transmission channel; or after the core network is switched, the base station establishes a communication connection to the target core network by using a fourth data transmission channel, and the base station establishes a communication connection to the source core network by using a third data transmission channel.

According to the method provided in the embodiments, the target base station configures the second radio bearer information for the UE by using the first radio bearer information of the source base station. The DRB in the second radio bearer information is used to transmit the first data and/or the second data forwarded from the source base station. In addition, the data retains a radio air interface sequence number allocated by the source base station. Therefore, the target base station at a receive end may send these data packets to the UE by using the DRB, so as to ensure that the data packets are not lost. In addition, the UE may sort, based on an order of the sequence number, all data packets obtained before and after the core network is switched, thereby ensuring that all the data packets can be submitted to the upper layer in sequence.

In addition, the target base station further establishes third radio bearer information, and a radio bearer in the third radio bearer information is used to carry data that is handed over to the target core network. Therefore, the data sent to the target core network may be transmitted by the target base station by using a new radio bearer, so as to avoid being out of order with a data packet in the source core network, and further ensure ordering of a data packet sent to the UE.

DESCRIPTION OF EMBODIMENTS

To make a person skilled in the art understand the technical solutions in the embodiments of this application better, and make the objectives, features, and advantages of the embodiments of this application clearer, the following further describes the technical solutions in the embodiments of this application in detail with reference to the accompanying drawings.

Before the technical solutions in the embodiments of this application are described, an application scenario and related technical terms in the embodiments of this application are first explained and described.

Figure 1A:
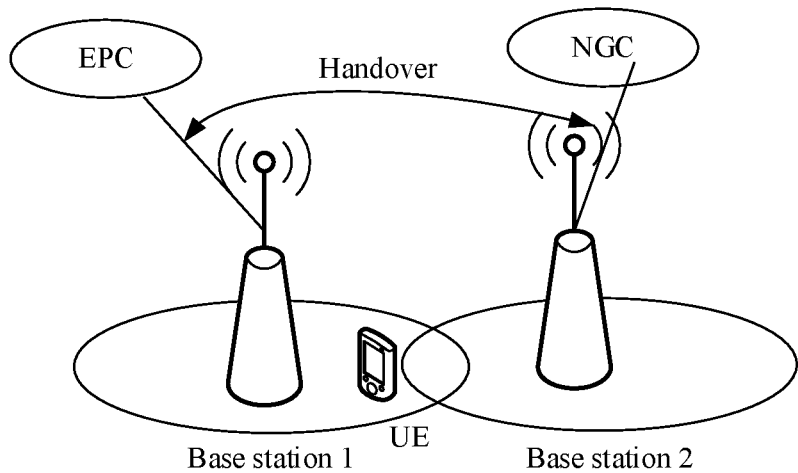
FIG. 1a is a schematic diagram of a scenario in which UE is handed over between different core networks according to an embodiment of this application.
Figure 1B:
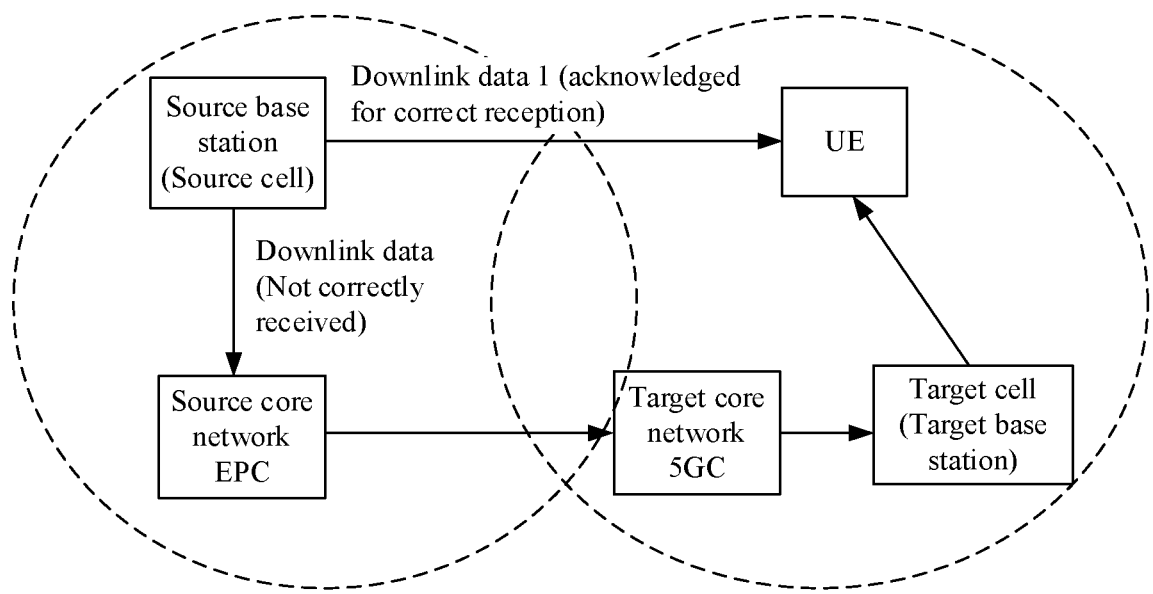
FIG. 1b is another schematic diagram of a scenario in which UE is handed over between different core networks according to an embodiment of this application.

The technical solutions of this application may be applied to a technical scenario in which a terminal is handed over between different core networks. As shown in FIG. 1*a*, different core networks in this scenario include a 4G core network EPC and a 5G core network 5GC, where the EPC is configured to provide a 4G core network function for a terminal, such as user equipment (UE), and the 5GC is configured to provide a 5G core network function for the terminal. In addition, the following is further included: an LTE base station (LTE eNB) connected to the EPC and an LTE base station (eLTE eNB) connected to the 5GC, or an LTE base station (LTE eNB) connected to the EPC and an NR base station gNB connected to the 5GC. The LTE eNB is configured to provide a wireless access service for the terminal; the eLTE eNB is configured to provide a wireless access service for the terminal; and the gNB is configured to provide a wireless access service for the terminal.

A scenario in which the UE is handed over between different base stations connected to two core networks: is mainly used for a case that the UE moves from a coverage area of one base station to a coverage area of another base station (for example, the UE finds that signal quality of the other base station is better). For example, the UE moves from a coverage area of a base station 1 to a coverage area of a base station 2. In this way, because wireless quality of the base station 2 is better, a network side decides to hand over the UE to the base station 2. However, because the base station 2 is connected only to the 5GC, the core network needs to be switched for the UE.

When the terminal is connected to the EPC by using the LTE eNB, a radio bearer (RB) between the LTE eNB and the terminal uses an LTE PDCP/LTE RLC/LTE MAC/LTE PHY protocol. When the terminal is connected to the 5GC by using the eLTE eNB, a radio bearer between the eLTE eNB and the terminal uses an NR SDAP/NR PDCP/LTE RLC/LTE MAC/LTE PHY protocol.

Specifically, the following describes a schematic structural diagram of a user plane or control plane protocol stack when a base station is connected to different core networks, and a function of each layer of protocol stack.

Figure 2A:
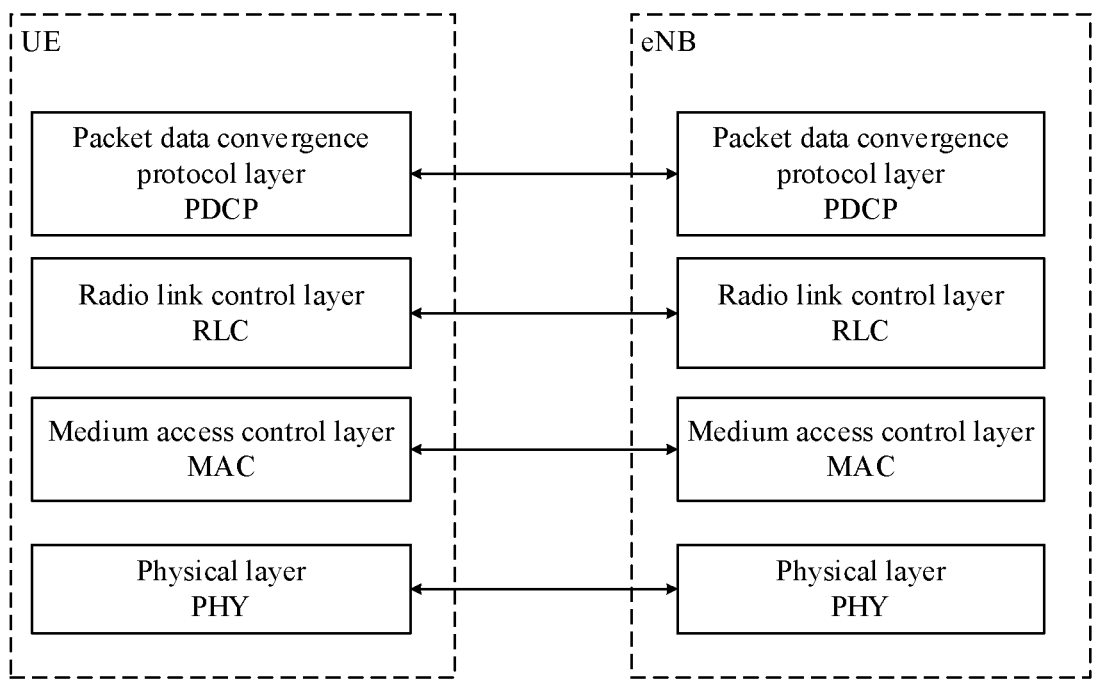
FIG. 2a is a schematic diagram of a user plane protocol stack when an LTE eNB is connected to an EPC according to an embodiment of this application.

FIG. 2*a* is a schematic diagram of a user plane protocol stack when an LTE eNB is connected to an EPC. For a user plane, protocol layers in a protocol stack of each of UE and the LTE eNB are respectively a packet data convergence protocol (PDCP) layer, a radio link control (RLC) layer, a medium access control (MAC) layer, and a physical (Physical, PHY) layer from top to bottom.

The PDCP layer may be used to perform services such as security, header compression, and encryption. The PDCP layer may exist in a plurality of PDCP entities, and each PDCP entity carries data of one RB. The PDCP layer is further used to configure and ensure that data submitted upward is ordered (that is, data is submitted in sequence).

The RLC layer is used to perform services such as segmentation, reassembly, and retransmission. The RLC layer may exist in a plurality of RLC entities, and each RLC entity may provide a service for each PDCP entity.

The MAC layer is used to provide a data transmission service for a service on a logical channel, and perform services such as scheduling, an acknowledgment and a negative acknowledgment of a hybrid ARQ (HARD).

The PHY layer is used to receive data from the MAC layer, and encode and transmit the data.

Figure 2B:
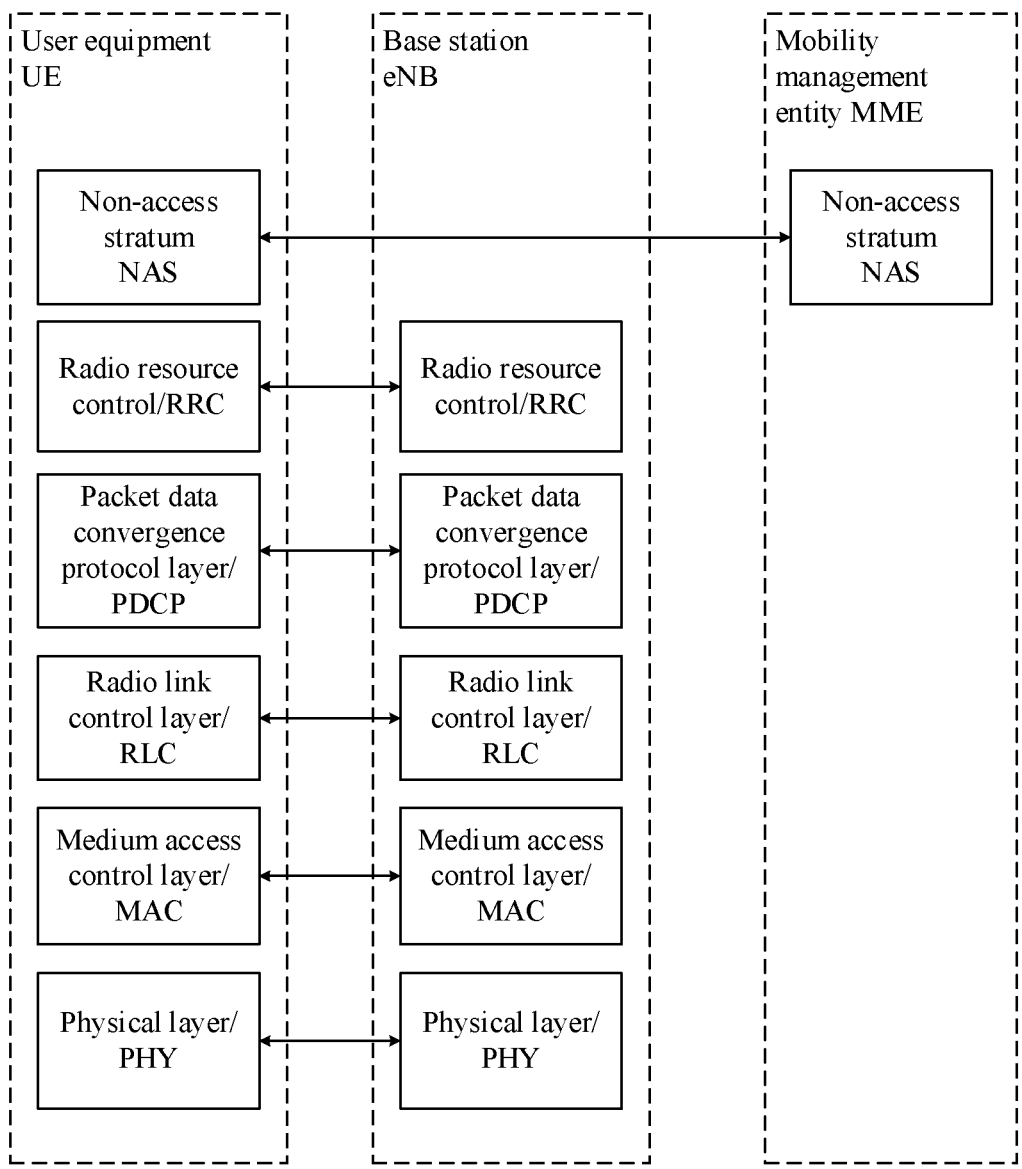
FIG. 2b is a schematic diagram of a control plane protocol stack when an LTE eNB is connected to an EPC according to an embodiment of this application.

FIG. 2*b* is a schematic diagram of a control plane protocol stack when an LTE eNB is connected to an EPC. For a control plane, protocol layers in a protocol stack of each of UE and the LTE eNB are respectively a non-access stratum (NAS) layer, a radio resource control (RRC) layer, a PDCP layer, an RLC layer, a MAC layer, and a PHY layer from top to bottom.

The RRC layer is used to perform functions such as message broadcast, paging, RRC link establishment, radio bearer control, movement, and UE measurement reporting control.

The NAS layer is used to perform functions such as authentication, mobility management, and security control.

Data after being processed at each layer is referred to as a protocol data unit (PDU) at this layer. For each layer, data input from an upper layer becomes a service data unit (SDU) at this layer. For example, data input by the PDCP layer to the RLC layer is referred to as a PDCP PDU for the PDCP layer, and is referred to as an RLC SDU for the RLC layer.

Figure 2C:
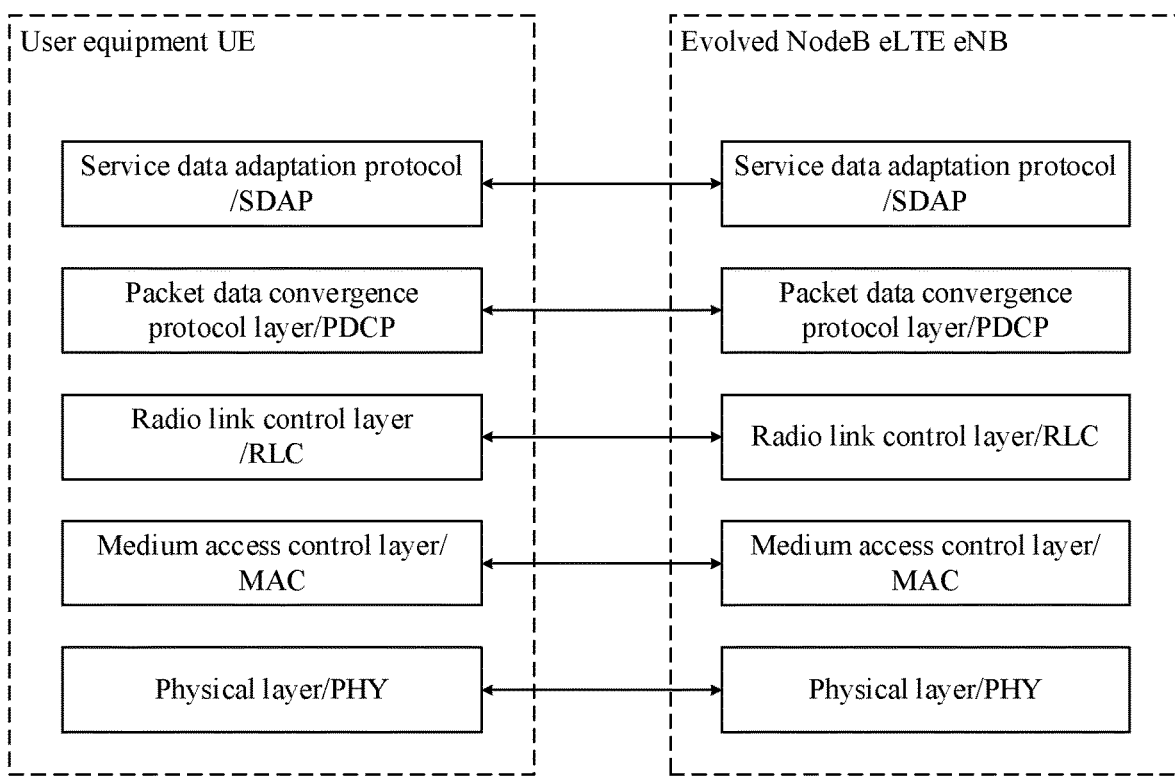
FIG. 2c is a schematic diagram of a user plane protocol stack when an eLTE eNB is connected to a 5GC according to an embodiment of this application.

FIG. 2*c* is a schematic diagram of a user plane protocol stack when an eLTE eNB is connected to a 5GC. Unlike a user plane protocol stack connected to an EPC, a service data adaptation protocol (SDAP) layer is added to a protocol stack of each of UE and the eLTE eNB.

The SDAP layer is used to map each quality of service flow (QoS flow) from the 5GC to a data radio bearer (DRB) at a radio access layer, that is, transmit, based on a service attribute corresponding to the QoS flow, a data packet corresponding to the QoS flow in a corresponding DRB. In addition, the SDAP layer may be further responsible for adding a QoS flow identifier to uplink and downlink data packets.

The UE and the base station perform transmission by using an RB. The RB is divided into a signaling radio bearer (SRB) and a data radio bearer (DRB). The SRB may be used to transmit an RRC message and a NAS message. The DRB may be used to transmit service data. In addition, each RB may correspond to one logical channel, or it may be considered that each RLC entity corresponds to one logical channel.

When the LTE base station is connected to the EPC, a GPRS tunneling protocol (GTP) data tunnel may be established between the EPC and the LTE base station based on an evolved universal terrestrial radio access-radio access bearer (E-RAB) granularity, and both uplink data transmission and downlink data transmission are performed based on the GTP tunnel of the E-RAB granularity. When establishing a service for the UE, the EPC allocates a GTP data tunnel to a corresponding E-RAB between the core network and the base station. The GTP data tunnel is identified by using a transport layer address and a tunnel endpoint identifier (GTP-TEID), and is used to transmit corresponding service data; and uplink and downlink data tunnels may be separated.

Corresponding DRB transmission is established between the LTE base station and the UE based on the E-RAB, that is, the E-RAB and the DRB are in a one-to-one correspondence. A PDCP layer protocol corresponding to each DRB between the LTE base station and the UE uses an LTE PDCP protocol, and an RLC/MAC/PHY layer uses an LTE RLC/MAC/PHY protocol.

When the LTE base station is connected to the 5GC, a tunnel is established between the 5GC and the LTE base station based on a PDU session, and a data packet of a corresponding PDU session is distinguished based on a flow (flow) granularity (that is, one PDU session may include a plurality of QoS flows). Each downlink data packet carries a corresponding flow ID and indication information indicating whether a reflection characteristic exists. The reflection characteristic refers to whether the UE can derive a mapping relationship between an uplink packet and a flow ID based on a mapping relationship between an attribute of a downlink packet (for example, a source IP address, a source port, a destination IP address, a destination port, and a transport layer protocol number) and the flow ID. In addition, the 5GC requires that a data packet sent by the LTE base station to the 5GC also carry a flow ID, so as to verify whether the UE maps the packet to a corresponding flow ID in a specified manner.

When the LTE base station is connected to the 5GC, a corresponding PDCP layer should use an NR PDCP protocol, and an SDAP layer is further added before the NR PDCP layer. The RLC/MAC/PHY uses an LTE RLC/MAC/PHY protocol.

For downlink data sent by the base station to the terminal, the PDCP layer or the SDAP layer of the terminal transmits downlink data correctly received in a source cell or a source base station to a higher layer. The source cell or the source base station forwards downlink data that is not correctly sent, to the source core network, the source core network forwards the corresponding downlink data to a target core network, the target core network forwards the downlink data to a target cell or a target base station, or the source cell or the source base station directly forwards the downlink data that is not correctly sent, to the target cell or the target base station, and the target cell sends a downlink data packet to the terminal in a new radio bearer.

For the downlink data, the source cell or the source base station resends, by using the target cell, data packets that are not acknowledged by the terminal for reception, the target cell re-allocates a sequence number to the packets in the wireless protocol, and the PDCP layer or the SDAP layer of the UE sends the data packets received from the source cell to an upper layer, regardless whether the data packets are out of order. For example, data packets 1, 3, and 5 are submitted to the upper layer. After receiving the data packets from the target cell, the PDCP layer or the SDAP layer of the UE submits the data packets received from the target cell to the upper layer. For example, data packets 2 and 4 are submitted to the upper layer, and therefore the data packets received by the upper layer of the UE are out of order. For example, the data packets 1, 3, and 5 are first received, and then the data packets 2 and 4 are received.

To resolve the foregoing technical problems, the following technical solutions are provided in this application. The following describes the technical solutions in the embodiments of this application in detail with reference to the accompanying drawings.

The technical solutions in the embodiments of this application mainly involve network elements such as a terminal, an EPC, a 5GC, an LTE eNB, and an eLTE eNB. The EPC and the 5GC represent two different core networks, and the LTE eNB is connected to the EPC, that is, a 4G core network, to provide a wireless access service for the terminal. The eLTE eNB is connected to the 5GC, that is, a 5G core network, and provides a wireless access service for the terminal.

In each embodiment of this application, a handover of the terminal between the EPC and the 5GC includes movement of the terminal from the EPC to the 5GC, or movement of the terminal from the 5GC to the EPC. Further, in a process that the terminal moves from the EPC to the 5GC, the LTE eNB located in the core network EPC is referred to as a source base station, the corresponding core network EPC is referred to as a source core network, the eLTE eNB located in the core network 5GC is referred to as a target base station, and the corresponding core network 5GC is referred to as a target core network. On the contrary, when the terminal moves from the 5GC to the EPC, the source core network is the 5GC, the source base station is the eLTE eNB, the target core network is the EPC, and the target base station is the LTE eNB. It should be noted that in a scenario, the source base station and the target base station may be a same base station, that is, the base station is connected to both the EPC and the 5GC.

In addition, the technical solutions in the embodiments of this application are also applicable to a scenario in which an LTE eNB is connected to an EPC, and a gNB is connected to a 5GC. Corresponding network elements mainly include a terminal, an EPC, a 5GC, an LTE eNB, and a gNB.

In a process that the terminal moves from the EPC to the 5GC, the LTE eNB connected to the core network EPC is referred to as a source base station, the corresponding core network EPC is referred to as a source core network, the gNB connected to the core network 5GC is referred to as a target base station, and the corresponding core network 5GC is referred to as a target core network. On the contrary, when the terminal moves from the 5GC to the EPC, the source core network is the 5GC, the source base station is the gNB, the target core network is the EPC, and the target base station is the LTE eNB. It should be noted that the source base station and the target base station may be a same base station, that is, the base station is connected to both the EPC and the 5GC.

In addition, it should be noted that, when a protocol describes interaction between a base station and a core network, and when base stations interact with each other, text descriptions of the base station and the core network are used. Therefore, in these descriptions of this application, the base station is used as a description object, and a source cell and a target cell are not used as description objects. In the embodiments of this application, the source cell and the target cell may still be used as description objects in other content.

Embodiment 1

Figure 3:
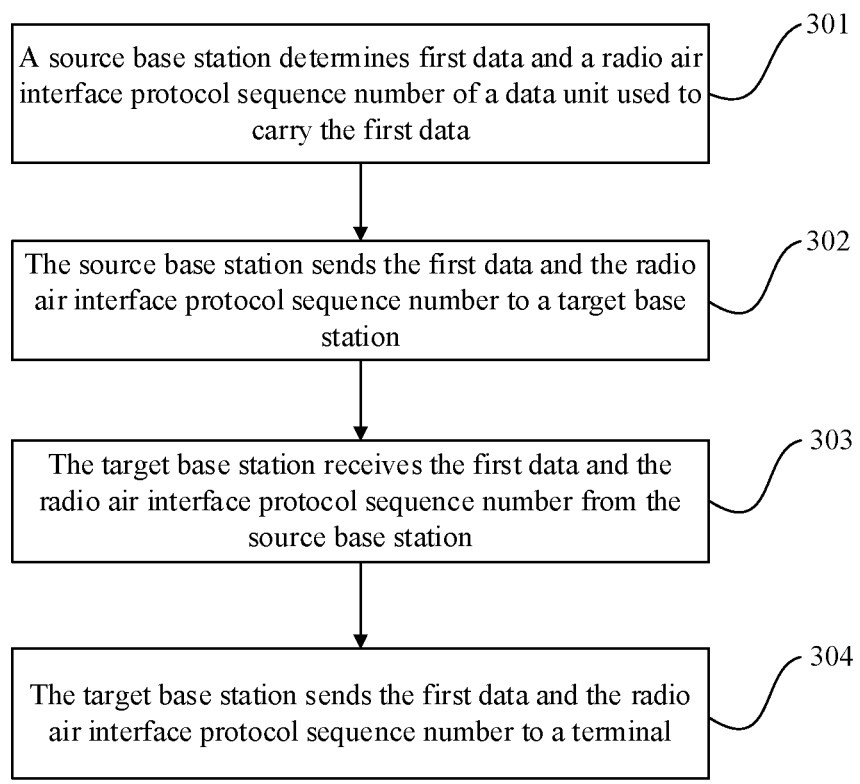
FIG. 3 is a flowchart of a data transmission method according to an embodiment of this application.

As shown in FIG. 3, this application provides a data transmission method. The method may be applied to a source base station. Specifically, the method includes the following steps.

Step 301: The source base station determines first data and a radio air interface protocol sequence number of a data unit used to carry the first data. The first data includes data that is not acknowledged by a terminal for correct reception during data transmission between the source base station and the terminal, and/or out-of-order data received by the source base station from the terminal.

Specifically, the first data sent by the source base station to a target base station includes uplink data and/or downlink data.

The downlink data is corresponding to a radio air interface protocol sequence number, for example, a data packet of a sequence number (SN) at a PDCP layer, that is, the first data may be divided into a plurality of data units or data packets, and each data unit or data packet is corresponding to one SN number. The SN number is allocated by the source base station.

Further, the first data to which the source base station allocates an SN number includes data that is sent by the source base station to the terminal but that has not been acknowledged by the terminal (haven't been acknowledged by the UE), and/or data that the source base station has allocated an SN number but that has not been sent to the terminal.

For example, the terminal is handed over from an EPC to a 5GC. The first data is in a form of a PDCP SDU, that is, a data packet that does not include a PDCP header. The source base station sends the PDCP SDU to the target base station, and further includes a data unit that indicates the first data or an SN number corresponding to the data packet in the source base station.

In addition, the uplink data further includes out-of-order data received by the source base station from the terminal, and being out-of-order means that some data packets are not correctly received by the source base station before the data packet correctly received by the source base station from the terminal. For example, data packets generated at an application layer of the terminal are in a sequence of data packets 1, 2, 3, 4, and 5. The source base station correctly receives only the data packets 1, 3, and 5. The terminal sends the data packets 2 and 4 on the source base station, but the source base station does not correctly receive the data packets 2 and 4. In this case, the data packets 3 and 5 are out of order for the source base station, because the data packets 2 and 4 are not received.

In the prior art, the source base station does not send these out-of-order data packets to the target base station, and the source base station directly submits these correctly received out-of-order data packets to a core network. Therefore, the data packets are out of order. In addition, the terminal sends, in a target cell, only those data packets that are not sent in a source cell (for example, the terminal does not send, in the target cell, the data packets 2 and 4 that are sent by the terminal but not correctly received by the source base station). The data packets that are sent but not correctly received by the source cell are discarded (for example, the data packets 2 and 4), and a packet loss occurs.

In this embodiment, for the uplink data, for example, the terminal is handed over from the EPC to the 5GC. The first data is described in a form of a PDCP SDU, that is, a data packet that does not include a PDCP header or the like is sent to the target base station, and further includes a data unit that indicates the first data or an SN number corresponding to a data packet in the source base station.

Step 302: The source base station sends the first data and the radio air interface protocol sequence number to the target base station.

A core network connected to the target base station is different from a core network connected to the source base station, and the source base station and the target base station are a source base station and a target base station of the terminal in a handover process between different core networks.

Specifically, that the source base station sends the first data and the radio air interface protocol sequence number to the target base station includes: The source base station sends, to the target base station through a first tunnel, the data that is in the first data and that is not acknowledged by the terminal for correct reception, and the radio air interface protocol sequence number; and/or sends the data that is in the first data and that is from the terminal and the radio air interface protocol sequence number to the target base station through a second tunnel.

The radio air interface protocol sequence number may be carried in a GTP-U (GTP User Plane) header or an extension header.

The first tunnel and the second tunnel may be different tunnels. Further, for the downlink data, the source base station sends a downlink data packet in the first data and a corresponding SN number to the target base station through a tunnel on a user plane (that is, the first tunnel). For the uplink data, the source base station sends an uplink data packet in the first data and a corresponding SN number through a tunnel on the user plane (that is, the second tunnel). In addition, before step 302, the source base station further notifies, by using control plane signaling, the target base station of an SN number range within which uplink data packets are received in an out-of-order manner.

Step 303: The target base station receives the first data and the radio air interface protocol sequence number from the source base station.

The radio air interface protocol sequence number is a sequence number of a data unit that is determined by the source base station and that is used to carry the first data. Optionally, the radio air interface protocol sequence number may be an SN number of a data unit or a data packet of the first data.

Step 304: The target base station sends the first data and the radio air interface protocol sequence number to the terminal.

According to the method provided in this embodiment, data sent by the source base station to the target base station includes a radio air interface protocol sequence number of a data unit of the data, and the radio air interface protocol sequence number can be identified by the terminal and is consistent with that of a data packet correctly received from the source base station and acknowledged by the terminal. Therefore, the terminal can sort, based on these sequence numbers, the data packet correctly received from the source base station and those data packets that are from the target base station, namely, forwarded from the source base station to the target base station, and that are not acknowledged by the terminal in the source base station for correct reception, so as to ensure that the data packets are submitted to an upper layer in sequence.

Optionally, the method further includes: The source base station determines second data, where the second data includes data that is received by the source base station from a source core network in a handover process of the terminal between core networks and that is to be sent to the terminal.

For example, in a time period in which the terminal is handed over from the EPC to the 5GC, an LTE eNB of the EPC receives data packets from the EPC that need to be sent to the terminal. These data packets have not been allocated a radio air interface protocol sequence number, namely, an SN number. The source base station notifies the target base station by using control plane signaling. Subsequently, an SN number needs to be allocated to these data packets. An allocation rule may be that based on a sequence number allocated by the source base station to a data packet for the terminal, a next sequence number is continuously allocated. For example, an SN number corresponding to a next data packet that is not allocated an SN number is indicated to the target base station. In addition, the next sequence number may be indicated by using a downlink count value, where the count value includes an SN number and a hyper frame number that are of a PDCP of a corresponding packet.

For example, sequence numbers allocated by the source base station to the data packets in the first data are from SN_0 to SN_100. Then, for the second data, a sequence number allocated by the target base station to the second data starts from SN_101, so that after the target base station sends the terminal the data that is allocated the sequence number, the terminal can correctly sort the data.

The method further includes: The source base station sends the second data to the target base station, so that the target base station continues to allocate, to the second data, a radio air interface protocol sequence number of a data unit of the second data based on the radio air interface protocol sequence number corresponding to the first data.

A specific sending manner includes: The source base station sends the second data to the target base station through a tunnel (for example, the first tunnel) on the user plane.

Figure 4:
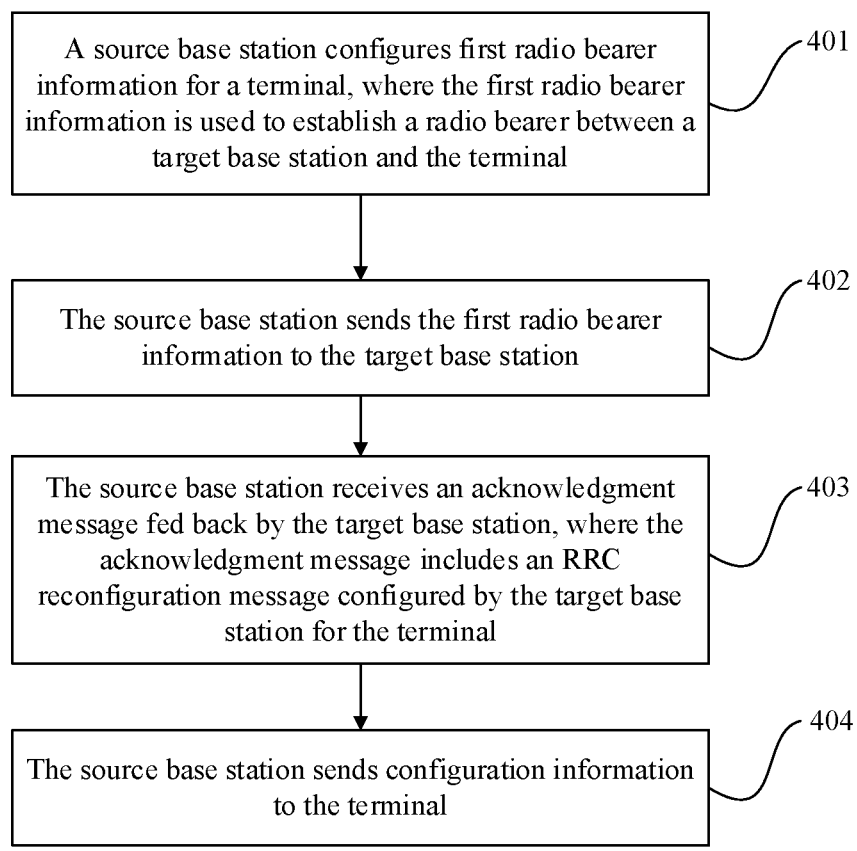
FIG. 4 is a flowchart of another data transmission method according to an embodiment of this application.

As shown in FIG. 4, in this embodiment, before step 302 in which the source base station sends the first data and the radio air interface protocol sequence number to the target base station, the method further includes the following steps.

Step 401: The source base station configures first radio bearer information for the terminal, where the first radio bearer information is used to establish a radio bearer between the source base station and the terminal.

Step 402: The source base station sends the first radio bearer information to the target base station, where the first radio bearer information includes configuration information of the radio bearer.

The configuration information of the radio bearer includes at least one of a radio bearer identifier, PDCP layer information configured by the source base station for the UE, RLC layer information configured by the source base station for the UE, or the like.

Optionally, the source base station may add the first radio bearer information to a handover request message sent to the target base station. The source base station may alternatively add the first radio bearer information to a handover requirement message to the source core network, then the source core network notifies a target core network of the first radio bearer information, and the target core network adds the first radio bearer information to a handover request message to the target core network.

Optionally, a message (a handover request message or a handover requirement message) sent by the source base station to the target base station carries an indication for requesting data forwarding.

The target base station receives the first radio bearer information, determines second radio bearer information based on the first radio bearer information, and generates an acknowledgment message, and then the target base station sends the acknowledgment message to the source base station.

The acknowledgment message carries the second radio bearer information. In addition, the acknowledgment message further carries tunnel information used by the target base station to receive the first data forwarded from the source base station. The tunnel information includes a transport layer address and a GTP-TEID. In addition, the tunnel information may further include tunnel information corresponding to uplink data and downlink data.

Optionally, the acknowledgment message may be a handover request acknowledgment message sent by the target base station to the source base station. The acknowledgment message may alternatively be a handover request acknowledgment message sent by the target base station to the target core network, and then the target core network sends a message to the source core network, where the message carries the second radio bearer information and tunnel information allocated by the target core network. The tunnel information allocated by the target core network is tunnel information used by the target core network to receive forwarded data from the source core network. The source core network adds the second radio bearer information and tunnel information allocated by the source core network to a handover command message to the source base station. The tunnel information allocated by the source core network is tunnel information used by the source core network to receive forwarded data from the source base station.

In addition, the method further includes: The target base station generates third radio bearer information, where the third radio bearer information includes configuration information of new data exchanged between the terminal and a core network connected to the target base station, for example, the configuration information includes a second radio bearer, used to configure, for the terminal, a radio resource that can carry new data exchanged with the target core network. The new data is data generated at the application layer of the UE and data received from the target core network and not forwarded from the source base station after the UE is handed over to the target core network.

Step 403: The source base station receives the acknowledgment message fed back by the target base station.

The acknowledgment message may carry the second radio bearer information between the target base station and the terminal, the second radio bearer information includes configuration information of a radio bearer, the radio bearer may be used to carry the first data, and the radio bearer may be the same as or different from the radio bearer in the first radio bearer information. For example, radio bearer identifiers of the radio bearers are the same.

In addition, the second radio bearer information may be further used to indicate an acceptance situation of the first data.

In addition, the acknowledgment message includes an RRC reconfiguration message configured by the target base station for the terminal, and the RRC reconfiguration message includes an ID of a cell that the terminal needs to access in the target base station, and the like. After receiving the acknowledgment message from the target base station, the source base station forwards the RRC reconfiguration message in the acknowledgment message to the terminal.

The RRC reconfiguration message in the acknowledgment message may carry the second radio bearer information.

In addition, the RRC reconfiguration message in the acknowledgment message further includes the third radio bearer information.

Step 404: The source base station sends configuration information to the terminal.

The configuration information may use RRC reconfiguration information. The RRC reconfiguration message may be the RRC reconfiguration message received by the source base station from the target base station in step 403.

Optionally, the configuration information may alternatively be sent to the terminal by using a handover notification message.

According to the method provided in this embodiment, the source base station sends radio bearer information to the target base station, so as to help the target base station configure a radio bearer between the target base station and the terminal, and further use the radio bearer to transmit the first data, so that both the target base station and the terminal can continue to use radio bearer configuration in the source base station to transmit or store the first data, thereby ensuring that the first data can continue to retain and use a previous sequence number on the target base station, and ensuring that the data packets corresponding to the first data are submitted in sequence.

Embodiment 2

In this embodiment, a process in which a target base station determines second radio bearer information based on first radio bearer information from a source base station and feeds back an acknowledgment message to the source base station is described in detail.

Figure 5:
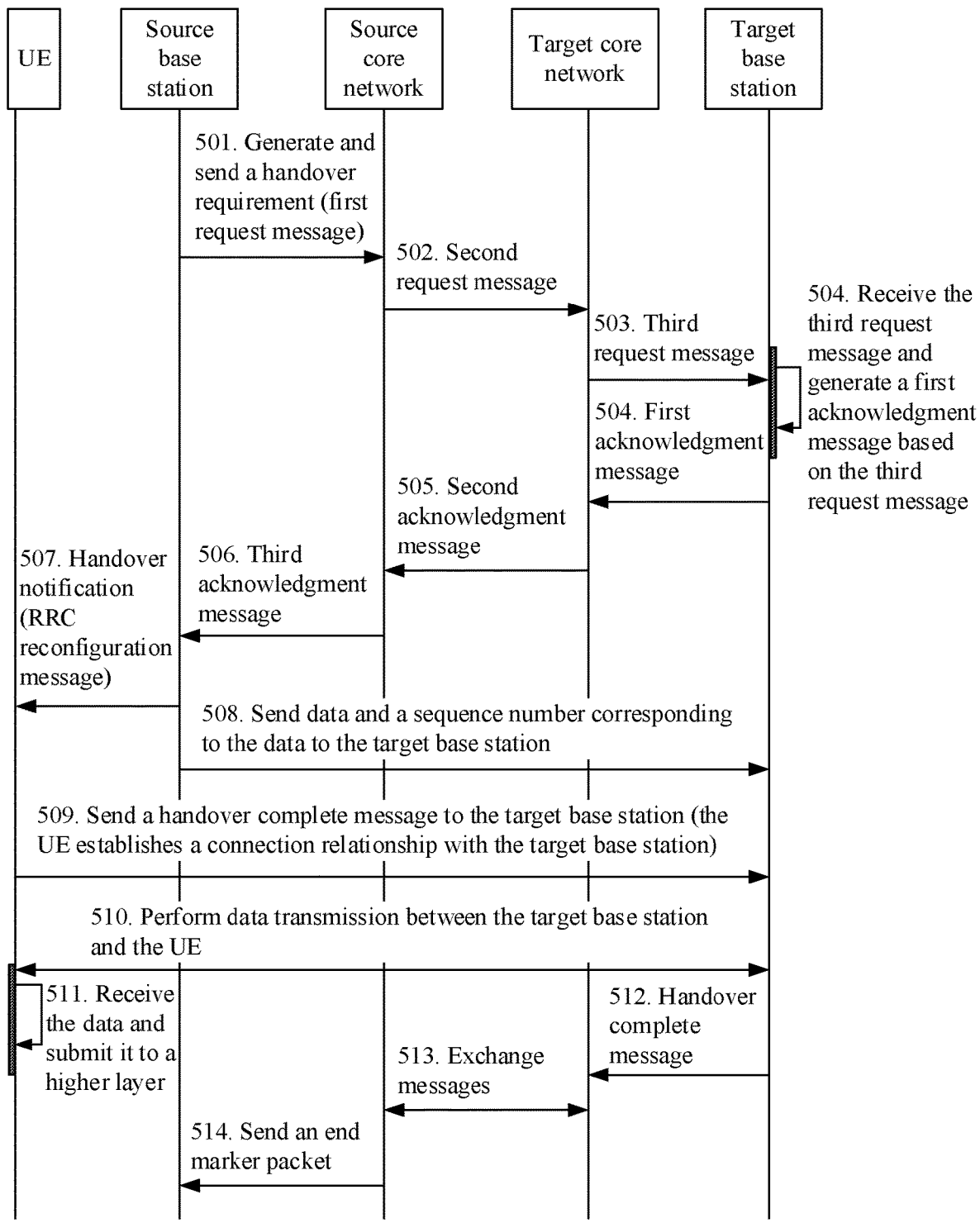
FIG. 5 is a signaling flowchart of a data transmission method according to an embodiment of this application.

As shown in FIG. 5, a method provided in this embodiment is about how the source base station and a terminal, the target base station and the terminal, and the source base station and the target base station process data during a handover, for example, a downlink data packet that is not acknowledged by the UE for correct reception, and an out-of-order uplink data packet that is received by the source base station from the terminal, to ensure that the downlink data packet and/or the uplink data packet are submitted in sequence.

Specifically, the method includes the following steps.

Step 501: The source base station generates a first request message, for example, a handover requirement message, where the first request message includes radio bearer configuration configured by the source base station for the UE.

The first request message further includes a handover type indication. The handover type indication is used to indicate a handover between different base stations in a core network of a same standard, or indicate a handover between two base stations corresponding to core networks of different standards. In addition, the handover type indication may further indicate whether the UE is handed over from a 5GC to an EPC or handed over from the EPC to the 5GC.

Optionally, the radio bearer configuration may be carried by using the first radio bearer information, and is used to establish a radio bearer between the source base station and the terminal.

If the UE is handed over from the 5GC to the EPC, the radio bearer configuration includes a DRB identifier, NR PDCP configuration information and NR SDAP configuration information corresponding to the DRB. Further, the NR SDAP configuration information includes a mapping relationship that is between a DRB and a QoS flow and that is configured by the source base station for the UE, that is, includes indicating the UE or the source base station to place which QoS flows on which DRB, so as to transmit a QoS flow by using a corresponding DRB. For example, there are three QoS flows, which are respectively a flow 1, a flow 2, and a flow 3. The source base station notifies, by using the NR SDAP configuration information, the UE to place uplink data packets of the flow 1 and the flow 2 on a DRB1, and place an uplink data packet of the flow 3 on a DRB2, and perform corresponding transmission.

In addition, the NR SDAP configuration information further includes at least one of the following: a PDU session ID carried by the DRB, whether an SDAP packet header is separately configured for SDAP uplink and downlink, and whether the DRB is a default DRB.

The PDU session ID is an identifier of a PDU session. The default DRB means that when a network side does not notify the terminal that an uplink data packet of a QoS flow is corresponding to which DRB, the UE maps the QoS flow to the default DRB. That the network side does not notify the terminal that an uplink data packet of a QoS flow is corresponding to which DRB means that the network side does not indicate, by using an RRC message, a mapping relationship between an identifier corresponding to the QoS flow and a DRB identifier, and does not indicate, by using a user plane, that an uplink data packet of the QoS flow is mapped to which DRB.

In another handover manner, if the UE is handed over from the EPC to the 5GC, the radio bearer configuration includes DRB configuration configured by the source base station for the UE. The DRB configuration specifically includes a DRB identifier and PDCP information that is configured for the UE by the source base station corresponding to the DRB.

The first request message may further include a service mapping relationship between different core networks, or may include a request information element that requests a source core network and a target core network to ensure a one-to-one correspondence between a service corresponding to an EPS bearer in some EPCs and a service corresponding to a QoS flow in the 5GC. For example, when the UE is handed over from the EPC to the 5GC, a source cell may request the source core network and the target core network to ensure that all data packets in some E-RAB IDs are mapped to a same QoS flow ID (for example, an E-RAB ID1 corresponds to a QoS flow ID2, and an E-RAB ID2 corresponds to a QoS flow ID1).

The EPS bearer is used to identify service flows having a same service processing characteristic (such as a scheduling policy or a queue management policy) in 4G. A minimum granularity of service classification in the EPC is an EPS bearer. In the EPS bearer, a core network allocates an E-RAB identifier to the EPS bearer for the base station. The QoS flow is service flows of the UE that have a same service processing characteristic (such as a scheduling policy or a queuing management policy) in 5G. A minimum granularity of service classification in the 5GC is a QoS flow. The core network 5GC allocates a QoS flow ID to each QoS flow for the base station.

Optionally, the first request message further includes an identifier of the target base station, such as an ID of the target base station.

Optionally, the first request message further includes an indication for requesting data forwarding.

Optionally, in the first request message, the first radio bearer information may be included in a form of a container, may be directly carried in a manner of a message information element, or may be carried partly in a form of a container and carried partly in a message information element. The container means that information carried in the container may be transparently transmitted to a target cell by using the core network, that is, the core network does not need to know a meaning of specific content in the message.

The source base station sends the first request message to the source core network.

Step 502: The source core network receives the first request message from the source base station, selects a target core network, and sends a part of content in the first request message to the target core network by using a second request message.

The part of content in the first request message includes at least one of the following: a handover type indication, radio bearer configuration configured by the source base station for the UE, a service mapping relationship between different core networks, and the identifier of the target base station.

Step 503: The target core network receives the second request message from the source core network, and sends a part of content in the second request message to the target base station by using a third request message.

Because the second request message includes the identifier of the target base station, that is, the ID of the target base station, the target core network can determine the target base station, and send the third request message.

Further, the part of content in the second request message includes at least one of the following: a handover type indication, radio bearer configuration configured by the source base station for the UE, and an indication for requesting data forwarding.

In addition, the third request message may further include service QoS-related information that the target core network notifies the target base station to establish. For example, if the target core network is the 5GC, the service QoS-related information includes a PDU session ID, a QoS flow ID, and quality of service information corresponding to the QoS flow (for example, a guaranteed rate, a maximum rate, and a priority). If the target core network is the EPC, the service QoS-related information includes an E-RAB ID and quality of service information corresponding to the E-RAB.

Step 504: The target base station receives the third request message from the target core network, allocates corresponding radio resource configuration to the UE based on content in the third request message, and generates a first acknowledgment message, for example, a handover request acknowledgment message, where the first acknowledgment message includes second radio bearer information.

The corresponding radio resource configuration (that is, the second radio bearer information) allocated to the UE includes at least one of the following: LTE PDCP configuration, NR PDCP configuration, and NR SDAP configuration.

Further, the LTE PDCP configuration includes some configuration of an LTE PDCP layer (such as a packet loss timer, header compression configuration, and a sequence number length at the PDCP layer). The NR PDCP configuration includes some configuration of the NR PDCP layer (such as a length of a packet loss timer, header compression configuration, a sequence number length at the PDCP layer, integrity protection configuration, out of order delivery configuration, and a length of a sorting timer).

Figure 6A:
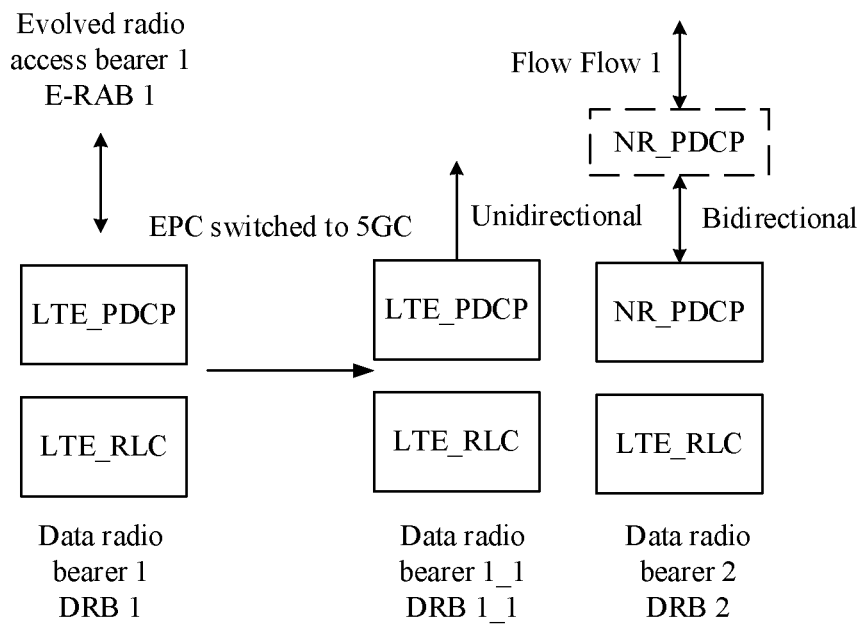
FIG. 6a is a schematic diagram when a protocol stack on a UE side is handed over from an EPC to a 5GC according to an embodiment of this application.

As shown in FIG. 6a, for radio bearer configuration used when the UE is handed over from the EPC to the 5GC, a radio resource bearer of the UE that is determined by the target base station based on the third request message from the target core network includes: a DRB1_1 configured by the target base station for the UE based on an original DRB1 (for example, if DRBs have the same identifier, the DRBs may also have the same PDCP configuration), where the DRB_1 is used to carry a data packet that is not correctly acknowledged by the UE for correct reception; and further includes: a data packet received by the source base station from the source core network EPC when the UE is handed over to the 5GC.

In addition, the target base station further generates a DRB2, where the DRB2 includes NR_PDCP configuration information, which is used to carry data in the core network 5GC.

Optionally, the target base station further allocates a plurality of DRBs to the UE, where some of the DRBs use the LTE PDCP configuration, and some of the DRBs use the NR PDCP configuration and the NR SDAP configuration. The radio resource configuration further includes at least one of the following: an E-RAB ID, a DRB ID, a correspondence between a DRB ID and a QoS flow ID, and a correspondence between a DRB ID and a PDU session ID.

Figure 6B:
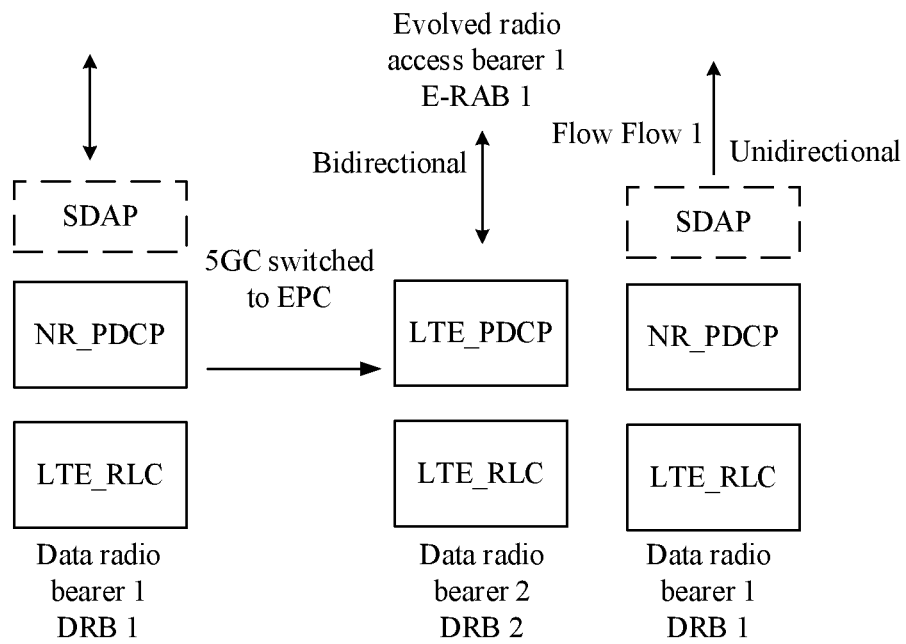
FIG. 6b is a schematic diagram when a protocol stack on a UE side is handed over from a 5GC to an EPC according to an embodiment of this application.

As shown in FIG. 6b, for radio bearer configuration used when the UE is handed over from the 5GC to the EPC, the target base station retains an original DRB1 and configuration information of the DRB1, and generates a DRB2. The newly generated DRB2 includes an LTE PDCP layer and an LTE RLC layer, which are used to carry data in the core network EPC.

In addition, the first acknowledgment message further carries tunnel information used by the target base station to receive first data forwarded from the source base station. The tunnel information includes a transport layer address and a GTP-TEID. Further, the tunnel information may further include tunnel information corresponding to uplink data and downlink data.

Optionally, the first acknowledgment message further includes: an acceptance situation, by the target base station, of a radio bearer sent by the source base station, which, for example, indicates which radio bearers are to be accepted, and may further indicate which radio bearers are not to be accepted.

After step 504 of the foregoing method, the method further includes: The target base station sends, to the target core network, the second radio bearer information allocated to the UE.

Optionally, the second radio bearer information may be carried by using the first acknowledgment message.

Optionally, the second radio bearer information includes third radio bearer configuration information.

Optionally, a specific manner in which the target base station sends the second radio bearer information (including the third radio bearer configuration information) to the target core network includes: In one manner, the second radio bearer information is included in a container for sending. Alternatively, in another manner, the second radio bearer information may be directly carried in a message information element. Alternatively, in a hybrid manner, the second radio bearer information may be carried partly in a container, and may be carried partly in a message information element. This embodiment sets no limitation on a specific manner of sending.

Step 505: The target core network receives the first acknowledgment message from the target base station, and generates a second acknowledgment message, where the second acknowledgment message includes at least a part of the first acknowledgment message; and sends the second acknowledgment message to the source core network.

Step 505 is the same as an existing procedure.

Optionally, the second acknowledgment message may further include data forwarding tunnel information, and the data forwarding tunnel message includes a transport layer address (that is, an IP address), a GTP-TEID, and the like.

Optionally, the second acknowledgment message may further include radio resource configuration allocated by the target base station to the UE, and the radio resource configuration may include at least one of LTE PDCP configuration, NR PDCP configuration, and NR SDAP configuration. The radio resource configuration may be different from the radio resource configuration configured by the source base station for the UE, that is, the radio resource configuration may include only different information from that in the radio resource configuration configured by the source base station for the UE.

Step 506: The source core network receives the second acknowledgment message from the target core network, generates a third acknowledgment message, and sends the third acknowledgment message to the source base station, where the third acknowledgment message includes at least a part of the second acknowledgment message.

The source core network allocates data forwarding tunnel information on the source core network side to an accepted PDU session, QoS flow, or DRB based on an acceptance situation in the second acknowledgment message, and configures the data forwarding tunnel information in the third acknowledgment message.

Optionally, the source core network and the target core network use same data tunnel information, for example, a user plane of the source core network and a user plane of the target core network are in a same module.

In addition, the third acknowledgment message further includes at least one of the following in the second acknowledgment message: an acceptance request of a service QoS of the target core network by the target base station, an acceptance situation, by the target base station, of radio bearer configuration sent by the source base station, and the radio resource configuration allocated by the target base station to the UE.

For example, if the terminal is handed over from the 5GC to the EPC, the third acknowledgment message may carry which DRBs are accepted by the target cell and which DRBs are rejected by the target cell. If the terminal is handed over from the EPC to the 5GC, the message may carry which E-RABs are accepted by the target cell and which E-RABs are rejected by the target cell, or may carry information such as which QoS flows are accepted by the target cell and which QoS flows are rejected by the target cell.

Optionally, a message type of the third acknowledgment message may be a handover command handover command.

Step 507: The source base station receives the third acknowledgment message from the source core network, generates a handover notification, and delivers the handover notification to the UE.

The handover notification includes the radio resource configuration that is in the third acknowledgment message and that is allocated by the target base station to the UE.

In addition, the handover notification may be an RRC reconfiguration message. Further, the RRC reconfiguration message includes second radio bearer information and/or third radio bearer information that are/is configured by the target cell or the target base station for the UE after the UE is handed over to the target base station in the target core network.

Step 508: The source base station sends, to the target base station, data and a radio air interface protocol sequence number corresponding to a data unit of the data.

Data sending in step 508 includes uplink data transmission and downlink data transmission. The following describes data transmission in the two directions.

(1) Downlink Data

For the downlink direction, the data includes first data and second data. The first data is data that has an SN number allocated by the source base station and that is not acknowledged by the terminal for correct reception during data transmission between the source base station and the terminal. The second data is data that is received by the source base station in a handover process of the terminal between core networks and that is to be sent to the terminal, and the data does not have an allocated SN number. Therefore, the target base station needs to continue to allocate an SN number to the second data based on the SN number previously allocated by the source base station.

Optionally, when the source base station forwards these data packets, these data packets are also forwarded in sequence, for example, these data packets are forwarded based on a sequence relationship received by the source base station from the source core network.

Further, the data that is not acknowledged by the terminal for correct reception includes: a data packet with a PDCP SDU to which the source base station has allocated an SN (a PDCP layer has allocated an SN to the PDCP SDU) and that is sent to the terminal, but for which no feedback is received from the terminal, and/or a data packet to which the source base station has allocated an SN number and that has not been sent to the terminal.

A. In the process in which the terminal is handed over from the EPC to the 5GC (that is, handed over from 4G to 5G)

The source base station sends the first data, the second data, and the SN numbers corresponding to the first data and the second data to the target base station (the target cell) by using a DRB tunnel or an E-RAB tunnel.

Optionally, after the source base station finishes sending the data and the SN numbers corresponding to the data, the method further includes: The source base station sends at least one end marker (end marker) packet to the target base station or the target cell, where the end marker packet is used to indicate that the source base station ends data forwarding on the tunnel, that is, no data is to be subsequently forwarded to the target base station on the tunnel. Optionally, the source base station sends the at least one end marker packet to the target base station or the target cell only after receiving an end marker from the source core network.

Optionally, the method further includes: The source base station sends a status transfer message to the target base station, where the status transfer message is used to indicate a receiving status of an uplink PDCP SN and a hyper frame number, and a sending status of a downlink PDCP SN and a hyper frame number. The status transfer message may be sent to the target base station by using the source core network and the target core network.

The status transfer message carries at least one of the following: an ID of a DRB on which the source base station needs to perform data forwarding; a next count value allocated by the target base station to a downlink data packet corresponding to the DRB, where the count value includes an SN number and a hyper frame number of a PDCP of a corresponding packet; and a receiving situation, by the source base station, of an uplink data packet corresponding to the DRB (a count value corresponding to the first PDCP packet that is not correctly received, where the count value includes an SN number and a hyper frame number of a PDCP of a corresponding packet, and an uplink receiving situation of another data packet following the PDCP packet). The status transfer message is usually sent before the source base station forwards the data packet to the target base station.

Figure 7:
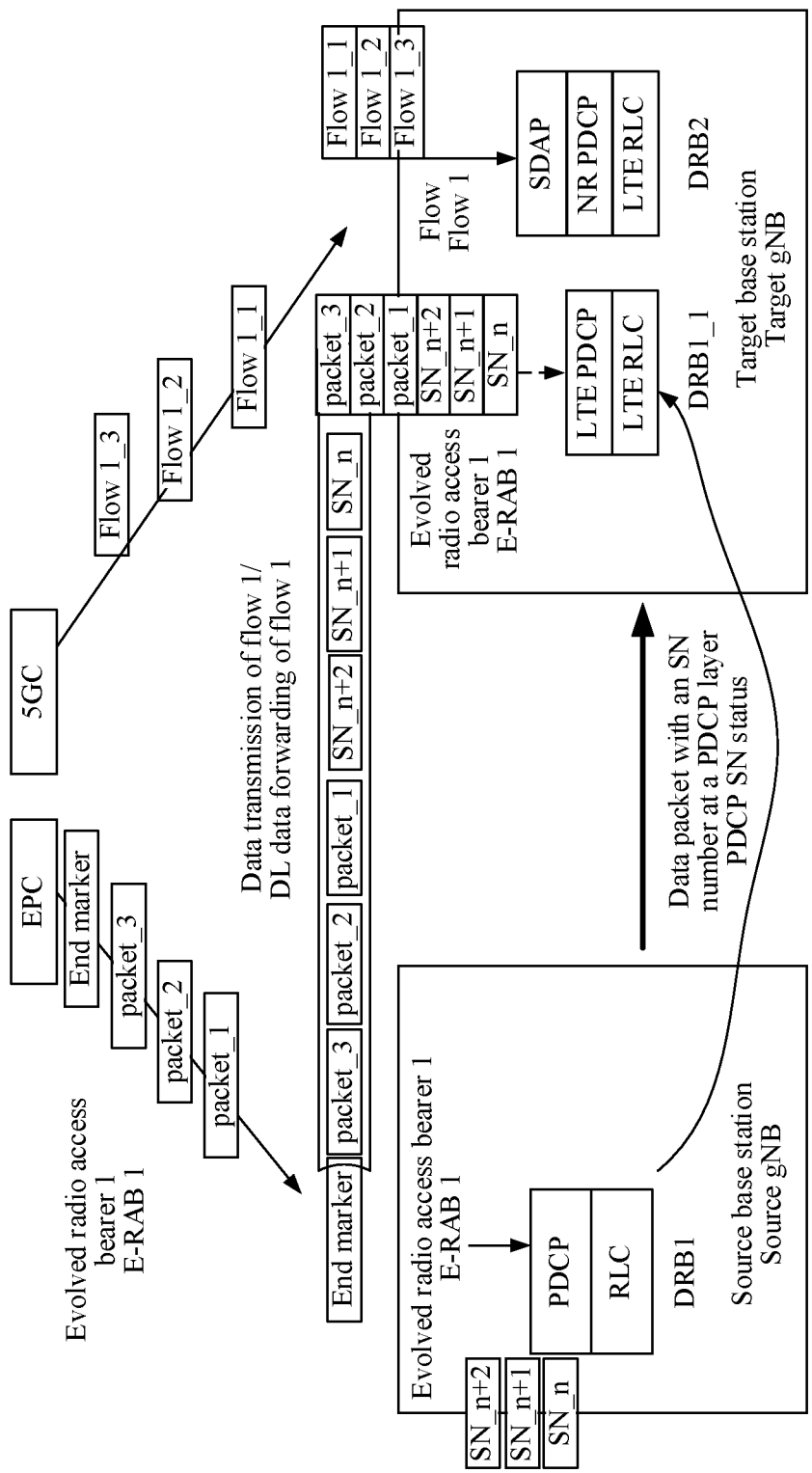
FIG. 7 is a schematic diagram of data transmission according to an embodiment of this application.

Further, as shown in FIG. 7, in a process in which the UE is handed over from the EPC to the 5GC, data transmitted from the source base station to the target base station includes:

first data: data that is not acknowledged by the terminal for correct reception and a data packet that carries a PDCP sequence number SN, that is, PDCP SDU with SN, for example, SN_n, SN_n+1, and SN_n+2; and/or second data: a new data packet from the EPC, where the second data does not carry a PDCP SN, that is, PDCP SDU without SN, for example, packet_1, packet_2, and packet_3. The target base station may continue to transmit data to the UE by using the DRB1_1 (using the LTE PDCP).

In addition, after the UE is handed over to the core network 5GC, the data transmitted to the target base station further includes third data.

The third data is new data from the 5GC (that is, data packets delivered in a 5GC format), and these data packets may be transmitted by using the DRB2 (using the NR PDCP), for example, three data packets flow 1_1/flow 1_2/flow 1_3 of a flow 1.

The target base station obtains the first data, the second data, the end marker, and the third data. The target base station first sends the data packet in the first data over the DRB1_1 configured for the UE, and then sends the data packet in the second data over the DRB1_1 configured for the UE. In addition, the target base station adds the obtained third data flow 1_1/flow 1_2/flow 1_3 to the DRB2.

In this embodiment, because the target base station uses the DRB of the LTE PDCP, the target base station may continue to use a PDCP SN number allocated by the source base station to the terminal on the DRB, and then the target base station transmits data to the terminal by using the DRB. The terminal can identify the data and submit the data to an upper layer based on the SN sequence, thereby ensuring that data packets are submitted in sequence.

B. In the process in which the terminal is handed over from the 5GC to the EPC (that is, handed over from 5G to 4G)

Data transmitted by the source base station (for example, an eLTE eNB) to the target base station (an LTE eNB) includes first data, where the first data is a PDCP SDU that is not acknowledged by the terminal for correct reception and that carries an SN number.

The source base station includes a source cell, and the target base station includes a target cell.

Optionally, these data packets may be transmitted to the target base station through a DRB tunnel or an E-RAB tunnel.

The data transmitted by the source base station to the target base station further includes: a new QoS flow data packet that is sent by the source base station from the source core network 5GC, and the QoS flow is accepted by the target cell to perform data forwarding (data forwarding).

Optionally, the source base station transmits the new QoS flow data packet to the target base station through a DRB tunnel or an E-RAB tunnel, or transmits the new QoS flow data packet to the target base station through a PDU session tunnel.

Optionally, after the source base station receives one or more end markers from the source core network, if a PDU session tunnel is established between the source base station and the target base station, the source base station forwards these end markers to the target base station through a corresponding PDU session tunnel. If a DRB tunnel is established between the source base station and the target base station, when no other data packet needs to be forwarded to the target base station through the DRB tunnel, the source base station generates one or more end markers, and sends the one or more end markers to the target base station through the corresponding DRB tunnel.

Optionally, after the source base station receives one or more end markers from the source core network, the source base station copies these end markers to each tunnel (including at least one of a DRB tunnel, an E-RAB tunnel, or a PDU session tunnel) between the source base station and the target base station.

Optionally, the method further includes: The source base station sends a status transfer message to the target base station, where the status transfer message is used to indicate a receiving status of an uplink PDCP SN and a hyper frame number, and a sending status of a downlink PDCP SN and a hyper frame number. The status transfer message may be sent to the target base station by using the source core network and the target core network.

The status transfer message carries at least one of the following: an ID of a DRB on which the source base station needs to perform data forwarding; a next count value allocated by the target base station to a downlink data packet corresponding to the DRB, where the count value includes an SN number and a hyper frame number of a PDCP of a corresponding packet; and a receiving situation, by the source base station, of an uplink data packet corresponding to the DRB, for example, a count value corresponding to the first PDCP packet that is not correctly received, where the count value includes an SN number and a hyper frame number of a PDCP of a corresponding packet, and an uplink receiving situation of another data packet following the PDCP packet. The status transfer message is usually sent before the source base station forwards the data packet to the target base station.

In this embodiment, for data forwarded from the source base station, the target base station may send the data by using a DRB that uses the NR PDCP and the NR SDAP. For new data transmitted from the target core network to the target base station (that is, a data packet delivered in an EPC format), the data may be transmitted by using a DRB that uses the LTE PDCP.

Because the target base station uses the DRB of the NR PDCP and the NR SDAP, the target base station may continue to use a PDCP SN number allocated by the source base station to the terminal on the DRB, and then the terminal can submit the data to an upper layer based on the SN sequence, thereby ensuring that data packets are submitted in sequence.

(2) Uplink Data

In step 508, a process in which the source base station (or the source cell) transmits the data to the target base station specifically includes:

The data that needs to be transmitted includes first data, the first data includes out-of-order data received by the source base station from the terminal, and being out-of-order means that there are some data packets that are not correctly received by the source base station before a data packet correctly received by the source base station from the terminal.

Optionally, these data packets may be transmitted to the target base station through a DRB tunnel or an E-RAB tunnel. These data packets are forwarded to the target base station in a form of a PDCP SDU, and carry an SN number corresponding to the PDCP SDU during forwarding.

It should be noted that, in step 508, manners of performing uplink and downlink data forwarding between the source base station and the target base station include the following two manners:

In one manner, data forwarding is directly performed between the target base station and the source base station, that is, the source base station directly sends the data and the sequence number corresponding to the data to the target base station.

In the other manner, data forwarding is indirectly performed by the target base station and the source base station by using the source core network and the target core network. That is, the source base station first sends the data and the sequence number corresponding to the data to the source core network, then the source core network sends the data and the sequence number corresponding to the data to the target core network, and then the target core network sends the data and the sequence number to the target base station.

Specifically, a transmission manner may be determined by internal configuration of the source core network and the target core network, or may be selected based on a protocol stipulation.

As shown in FIG. 5, the method further includes:

Step 509: The terminal UE receives the handover notification from the source base station, and sends a handover complete message to the target base station, to indicate that the UE is ready for data transmission.

Specifically, the UE determines a target cell based on a target cell ID carried in the handover notification, and then establishes a communication connection to the target cell.

The handover notification may be an existing message type, such as an RRC reconfiguration message. Further, the RRC reconfiguration message includes radio bearer configuration information configured by the target cell or the target base station for the UE. The radio bearer configuration information includes the second radio bearer information and/or the third radio bearer information.

Step 510: Perform data transmission between the target base station and the terminal UE.

Specifically, the data transmission includes data transmission in a downlink direction and data transmission in an uplink direction.

The following first describes a specific process of the data transmission in the downlink direction.

(1) Downlink Data:

For the process in which the UE is handed over from the EPC to the 5GC:

Two types of radio bearer information are configured on the target base station side: One type is a radio bearer in the second radio bearer configuration information and is used to carry first data and/or second data forwarded from the source base station or the source cell. The other type is a radio bearer in the third radio bearer configuration information and is used to carry a new data packet from the 5GC, that is, an SDAP SDU.

The second radio bearer configuration information may be the same as or different from the first radio bearer information configured by the source base station for the UE.

To ensure that the UE submits the data to an upper layer based on a sequence of data packets, the target base station (the target cell) first sends the first data and/or the second data to the UE by using the radio bearer in the second radio bearer configuration information. After the UE acknowledges that these data packets are correctly received, the target base station sends the new data packet from the 5GC to the UE by using the radio bearer in the third radio bearer configuration information.

Specifically, a process in which the target base station determines whether the first data and/or the second data are/is correctly received by the UE includes:

In a possible implementation, the target base station determines a receiving situation of the UE by using status information of an RLC layer. Further, after receiving a data packet from the target base station, the UE sends RLC status information to the target base station, where the RLC status information indicates the data packet received by the UE. After receiving the status information fed back by the UE, the target base station can determine, based on an indication of the status information, whether the data packet is correctly received. For example, each data packet includes one identifier, and the identifier is used to indicate that the UE correctly receives the data packet sent by the target base station.

In another possible implementation, the target base station determines, by using an ACK at a MAC layer, whether the data packet is correctly received by the UE. Specifically, if the target base station receives an ACK from the UE, the target base station considers that the UE correctly receives the data packet; otherwise, the target base station considers that the UE does not correctly receive the data packet.

In addition, whether the UE correctly receives a data packet of a DRB resource may be fed back in another manner. A specific implementation is not limited in this embodiment of this application.

After the UE is handed over to the target base station, because the core network connected to the UE has been handed over from the EPC to the 5GC, a manner of receiving a data packet at a protocol layer above a wireless protocol layer of the UE changes to a manner of receiving a data packet when the UE is connected to the 5GC. Downlink data received by the UE from the radio bearer in the second radio bearer information should be submitted to an upper layer in a manner of connecting to the 5GC.

For example, the UE determines, based on a correspondence between an E-RAB ID and a PDU session ID/QoS flow ID, to submit the downlink data packet received from the radio bearer in the second radio bearer information to the upper layer by using an interface between which SDAP entity and the upper layer, and does not need to notify reflection characteristic information and a flow ID of the packet.

Alternatively, the UE determines, based on a correspondence between an E-RAB ID and a PDU session ID/QoS flow ID, an SDAP entity to which the downlink data packets received from the radio bearer in the second radio bearer information are to be submitted. The SDAP entity further submits these downlink data packets received from the radio bearer in the second radio bearer information to the upper layer. When the SDAP entity submits the downlink data packets to the upper layer, the SDAP entity does not need to notify reflection characteristic information and a flow ID of the packets.

For the process in which the UE is handed over from the 5GC to the EPC:

Two types of radio bearer information are configured on the target base station side: One type is a radio bearer in the second radio bearer configuration information and is used to carry first data and/or second data forwarded from the source base station or the source cell, and the other type is a radio bearer in the third radio bearer configuration information and is used to carry a new data packet from the EPC, that is, an LTE PDCP SDU.

To ensure that the UE submits the data to an upper layer based on a sequence of data packets, the target base station (the target cell) first sends the first data and/or the second data to the UE by using the radio bearer in the second radio bearer configuration information. After the UE acknowledges that these data packets are correctly received, the target base station sends the new data packet from the EPC to the UE by using the radio bearer in the third radio bearer configuration information.

Specifically, a process in which the target base station determines whether the first data and/or the second data are/is correctly received by the UE is the same as the description in the process in which the UE is handed over from the EPC to the 5GC, and details are not described herein again.

After the UE is handed over to the target base station, because the core network connected to the UE has been handed over from the 5GC to the EPC, a manner of receiving a data packet at a protocol layer above a wireless protocol layer of the UE changes to a manner of receiving a data packet when the UE is connected to the EPC. Downlink data received by the UE from the radio bearer in the second radio bearer information should be submitted to an upper layer in a manner of connecting to the EPC.

For example, the UE determines, based on a correspondence between an E-RAB ID and a PDU session ID/QoS flow ID, to submit the downlink data packet received from the radio bearer in the second radio bearer information to the upper layer by using an interface between which LTE PDCP entity and the upper layer, and does not need to notify reflection characteristic information and a flow ID of the packet.

Alternatively, the UE determines, based on a correspondence between an E-RAB ID and a PDU session ID/QoS flow ID, an LTE PDCP entity to which the downlink data packets received from the radio bearer in the second radio bearer information are to be submitted. The LTE PDCP entity further submits these downlink data packets received from the radio bearer in the second radio bearer information to the upper layer. When the LTE PDCP entity submits the downlink data packets to the upper layer, the LTE PDCP entity does not need to notify reflection characteristic information and a flow ID of the packets.

(2) Uplink Direction:

In step 510, data transmission between the target base station and the UE includes: data transmission in the process in which the UE is handed over from the EPC to the 5GC, and data transmission in the process in which the UE is handed over from the 5GC to the EPC.

The data transmission in the process in which the UE is handed over from the EPC to the 5GC specifically includes: The UE resends, to the target base station by using the radio bearer in the second radio bearer information, these LTE PDCP SDUs that are not acknowledged by the source cell for correct reception in the source cell; optionally, may further exclude these LTE PDCP SDUs that are acknowledged by the target base station for correct reception; and send a new data packet, that is, an SDAP SDU, from the upper layer to the target base station by using the radio bearer in the third radio bearer information.

The data transmission in the process in which the UE is handed over from the 5GC to the EPC specifically includes: The UE resends, to the target base station by using the radio bearer in the second radio bearer information, these NR PDCP SDUs that are not acknowledged by the source cell for correct reception in the source cell; optionally, may further exclude these NR PDCP SDUs that are acknowledged by the target base station for correct reception; and send a new data packet, that is, an LTE PDCP SDU, from the upper layer to the target base station by using the radio bearer in the third radio bearer information.

Optionally, to ensure that the base station submits data to the upper layer based on a sequence of data packets, the UE may first transmit these unsuccessfully sent PDCP SDUs on the radio bearer in the second radio bearer information, and then transmit the new data packet on the radio bearer in the third radio bearer information after acknowledging that these data packets are correctly received by the base station.

Alternatively, when transmitting the previously unsuccessfully sent PDCP SDUs on the radio bearer in the second radio bearer information, the UE may send an end marker on the radio bearer in the second radio bearer information. For example, the end marker may be indicated by using an SDAP layer, a PDCP layer, or an RLC layer, for example, indicated by using a bit in a packet header of each of these layers, or indicated by using a PDU that does not carry a payload and that is at each of these layers, or indicated by using a control PDU of each of these layers. Further, the end marker may further indicate that ending occurs on a data packet of which QoS flow. The UE may transmit the new data packet on the radio bearer in the third radio bearer information at the same time, that is, the UE may transmit the new data packet on the radio bearer in the third radio bearer information without determining whether the data packets transmitted on the radio bearer in the second radio bearer information are correctly received by the base station.

After the UE is handed over from the EPC to the 5GC, because the core network connected to the target base station is the 5GC, a data packet to be submitted by the target base station to the core network should be submitted in a manner of connecting to the 5GC. Uplink data received by the target base station from the radio bearer in the second radio bearer information should be submitted to the core network in a manner of connecting to the 5GC.

For example, the target base station determines, based on a correspondence between an E-RAB ID and a PDU session ID/QoS flow ID, to send uplink data packets received from the radio bearer in the second radio bearer information to the target core network 5GC through a tunnel corresponding to which PDU session, and adds a QoS flow ID to each data packet. For example, the QoS flow ID is determined based on the correspondence between an E-RAB ID and a PDU session ID/QoS flow ID.

Alternatively, the target base station determines, based on a correspondence between an E-RAB ID and a PDU session ID/QoS flow ID, an SDAP entity to which uplink data packets received from the radio bearer in the second radio bearer information are to be submitted. The SDAP entity further submits the uplink data packets received from the radio bearer in the second radio bearer information to the target core network. When submitting these uplink data packets to the core network, the SDAP entity adds a QoS flow ID to each data packet. For example, the QoS flow ID is determined based on the correspondence between an E-RAB ID and a PDU session ID/QoS flow ID.

After the UE is handed over from the 5GC to the EPC, because an interface between the base station and the core network has been changed to an interface of the EPC, after receiving a data packet on an old DRB, the base station needs to submit the data packet in a new data packet format.

For example, the target base station knows, based on the correspondence between an E-RAB ID and a PDU session ID/QoS flow ID, that an uplink data packet received on an SDAP entity using an NR PDCP DRB is to be submitted to the core network through an interface between which PDCP entity using the LTE PDCP and the upper layer, and sends the uplink data packet to the core network in a GTP-U format of the EPC. Optionally, when the uplink data packet is submitted to the core network, a flow ID does not need to be carried.

After the UE is handed over to the target base station, because the core network connected to the target base station is the EPC, the data packet submitted by the target base station to the core network should be submitted in a manner of connecting to the EPC. Uplink data received by the target base station from the radio bearer in the second radio bearer information should be submitted to the core network in a manner of connecting to the EPC.

For example, the target base station determines, based on a correspondence between an E-RAB ID and a PDU session ID/QoS flow ID, to send the uplink data packet received from the radio bearer in the second radio bearer information to the target core network EPC through a tunnel corresponding to which E-RAB, and a flow ID does not need to be carried.

Alternatively, the target base station determines, based on a correspondence between an E-RAB ID and a PDU session ID/QoS flow ID, to submit the uplink data packets received from the radio bearer in the second radio bearer information to which LTE PDCP entity, then the LTE PDCP entity submits the uplink data packets received from the radio bearer in the second radio bearer information to the target core network, and the LTE PDCP entity submits these uplink data packets to the core network. Optionally, when the uplink data packet is submitted to the core network, a flow ID does not need to be carried.

Optionally, the target base station first submits the data of the radio bearer in the second radio bearer information to the target core network, and then submits the data of the radio bearer in the third radio bearer information to the target core network. For example, after receiving an end marker on the radio bearer in the second radio bearer information, the target base station submits the data of the radio bearer in the third radio bearer information to the target core network.

Step 511: The UE receives the data and the sequence number corresponding to the data packet from the target base station, and submits the data packet to a higher layer based on an order of the sequence number.

According to the method provided in this embodiment, the target base station configures the second radio bearer information for the UE by using the first radio bearer information of the source base station. The DRB in the second radio bearer information is used to transmit the first data and/or the second data forwarded from the source base station. In addition, the data retains an SN number allocated by the source base station. Therefore, the target base station at a receive end may send these data packets to the UE by using the DRB, so as to ensure that the packets are not lost. In addition, the UE may sort, based on an order of the sequence number, all data packets obtained before and after the core network is switched, thereby ensuring that all the data packets can be submitted to the upper layer in sequence.

In addition, the target base station further establishes third radio bearer information, and a radio bearer in the third radio bearer information is used to carry data that is handed over to the target core network. Therefore, the data received by the target core network may be transmitted by the target base station by using a new radio bearer, so as to avoid being out of order with a data packet in the source core network, and further ensure ordering of a data packet sent to the UE.

For example, in step 510, the UE first submits the data received from the radio bearer in the second radio bearer information to the higher layer, and then submits the data received from the radio bearer in the third radio bearer information to the higher layer, thereby ensuring that the data packets are submitted in sequence.

Optionally, in the foregoing embodiment, after step 511, the following steps may be further included:

Step 512: The target base station sends a handover complete message to the target core network.

The handover complete message is used to notify the target core network that the UE has completed a handover between different core networks. The handover complete message may be an existing message type, such as a handover notify (handover notify), a path switch request (path switch request), or a relocation complete (relocation complete), or may be a newly defined message type.

Step 513: The target core network exchanges information with the source core network.

The exchange process may use an existing process.

Step 514: The source core network sends an end marker (end marker) packet to the source base station.

The end marker packet is used to notify the target cell that the source core network has stopped sending the data packet to the source base station (that is, no data packet is to be subsequently sent to the source base station).

Optionally, the source core network may send one or more end marker packets to the source base station.

For the source core network EPC, each E-RAB tunnel has one end marker packet. For the core network 5GC, each PDU session may be corresponding to one end marker packet, that is, no data packet of the PDU session is to be subsequently sent to the source base station. Alternatively, each QoS flow may be corresponding to one end marker packet, that is, no packet of the QoS flow is to be subsequently sent to the source base station.

Optionally, the source core network may add an indication to a GTP-U header to indicate that the packet is an end marker packet.

It should be noted that in the foregoing embodiment, there is no strict sequence relationship between step 507 and step 508, that is, step 508 may be performed before step 507. In addition, there is no strict sequence relationship among steps 510, 511, and 512, that is, step 512 may be performed before step 510 and step 511, or step 510 and step 511 may be performed before step 512.

However, it should be emphasized that, in step 510, the target base station needs to transmit the data to the terminal after receiving a handover complete message sent by the UE, so as to ensure that the UE can perform data transmission with the target base station.

After step 514, after receiving the end marker packet sent by the source core network, the source base station sends the end marker packet to the target base station. For a specific process, refer to the description in step 508. Details are not described herein again.

Embodiment 3

This embodiment is specific to an application scenario in which a source base station and a target base station are a same base station in Embodiment 1 and Embodiment 2. That is, basic steps of this embodiment are basically the same as those in the methods in Embodiment 1 and Embodiment 2, that is, a data sending method and a method for configuring radio bearer information for UE by the target base station are the same. A difference lies only in that after the UE is handed over between core networks, for the UE, the base station may perform data transmission with a source core network and a target core network respectively by using two transmission ports. Details are as follows:

In a handover process of the UE, for the UE, a connection is established between the base station and the two core networks by using a data transmission channel. Therefore, the base station submits, to the source core network, data sent to the source core network, and submits, to the target core network, data sent to the target core network.

Figure 9:
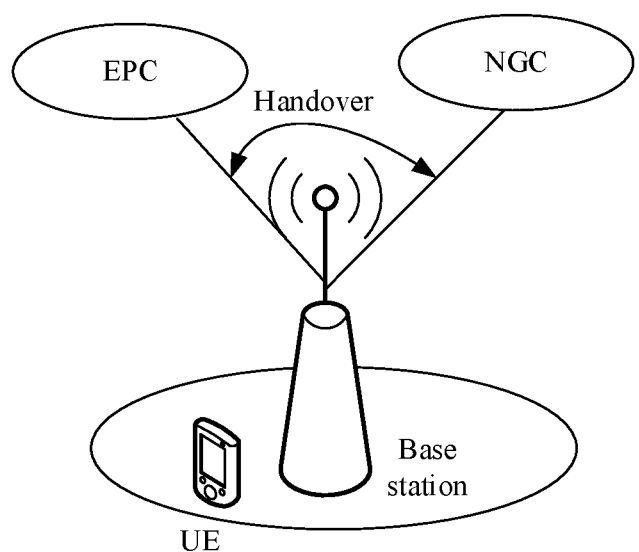
FIG. 9 is a schematic diagram of a scenario in which two core networks are connected to one base station simultaneously according to an embodiment of this application.

In this embodiment, referring to FIG. 9, a scenario in which UE is handed over between two core networks connected to a same base station is mainly used in a load sharing scenario between the two core networks, that is, load sharing of each core network. For example, quality of signals the UE receives from a source cell and a target cell of the base station does not greatly change (the source cell and the target cell may be a same cell or may be different cells). However, because a load of an EPC to which the UE is originally connected is relatively heavy, a network side decides to change the core network connected to the UE to a 5GC.

Figure 8:
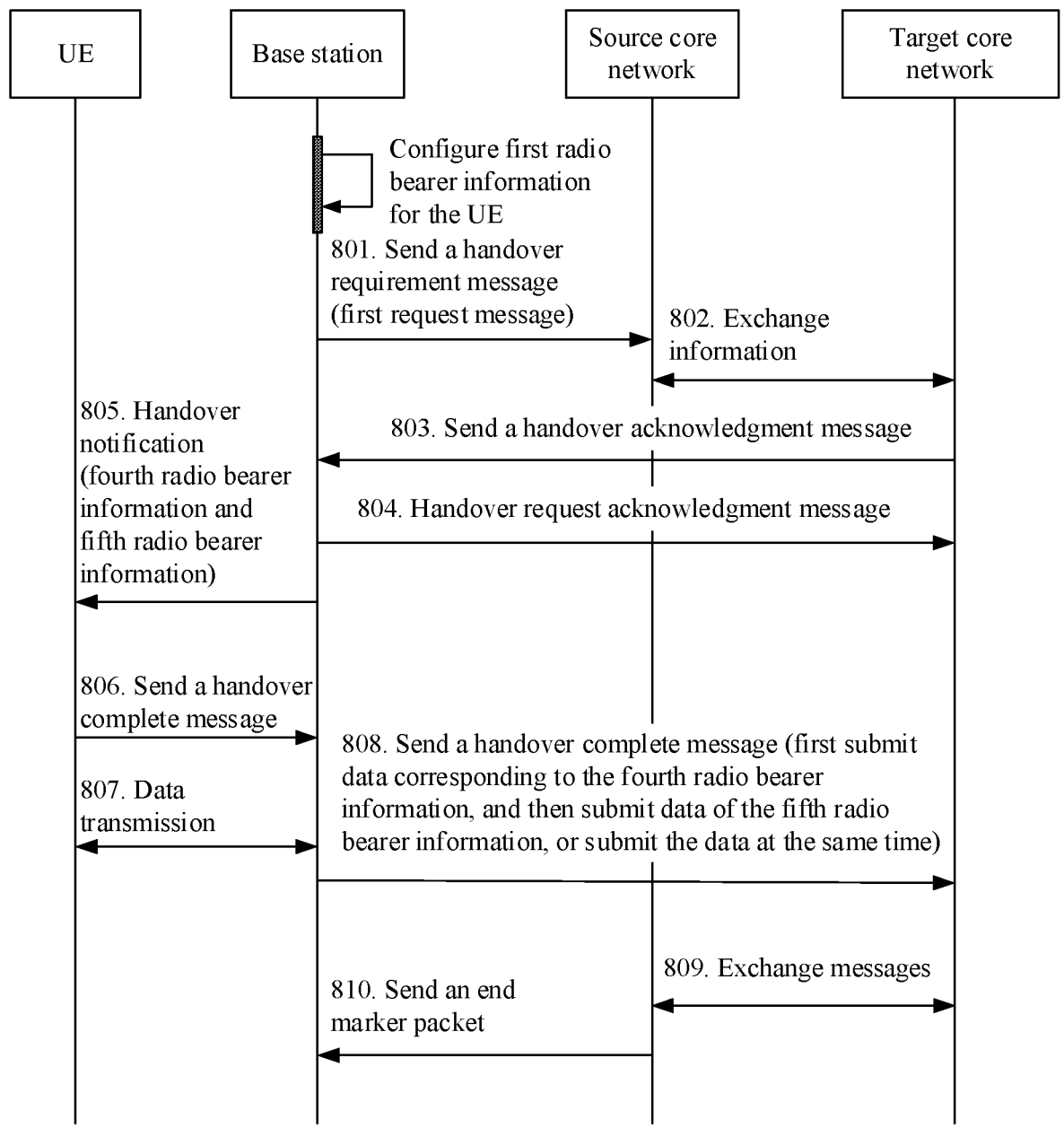
FIG. 8 is a signaling flowchart of another data transmission method according to an embodiment of this application.

As shown in FIG. 8, for example, a source base station and a target base station are a same base station, and the method specifically includes the following steps.

Step 801: A base station sends a handover requirement message to a source core network.

The handover requirement message may be an existing message, for example, handover required, and the handover requirement message may alternatively be another newly defined message, for example, a relocation request.

The handover requirement message may carry a request for handing over to a target core network, or may carry a request for maintaining, by the base station, a data transmission channel with two core networks in a handover process, that is, the UE is connected to both of two core networks 5GC and EPC.

Before step 801, the method further includes: The base station configures first radio bearer information for the UE, where the first radio bearer information is used to establish a radio bearer between the base station and the UE.

Step 802: The source core network receives the handover requirement message, and exchanges a message with the target core network.

Step 803: After exchanging a message with the source core network, the target core network sends a handover request message to the base station. The message notifies the base station to connect the UE to both of the two core networks 5GC and EPC.

Step 804: The base station sends a handover request acknowledgment message to the target core network.

Step 805: The base station receives the handover request acknowledgment message, and sends a handover notification to the UE.

The handover notification message may include at least one of the following content: fourth radio bearer information and fifth radio bearer information.

The fourth radio bearer information is generated by the base station based on the first radio bearer information. The fourth radio bearer information includes configuration information of a radio bearer, and the configuration information of the radio bearer includes at least one of: a radio bearer identifier, corresponding PDCP layer information (for example, NR PDCP layer information when the UE is handed over from the 5GC to the EPC) that is configured by the base station for the UE to connect to the source core network, RLC layer information configured by the base station for the UE, an indication of keeping configuration related to the first radio bearer, and the like.

The radio bearer in the fourth radio bearer information is used to carry data in the source core network. For downlink transmission, the data is new data from the source core network and a downlink PDCP SDU that is not acknowledged by the UE for correct reception before a handover. For uplink transmission, the data is an uplink PDCP SDU that is not acknowledged by the base station for correct reception before the UE is handed over.

The fifth radio bearer information is radio bearer information generated by the base station based on content notified by the target core network. The fifth radio bearer information includes configuration information of a radio bearer, and the configuration information of the radio bearer includes at least one of: a radio bearer identifier, corresponding PDCP layer information (for example, LTE PDCP layer information when the UE is handed over from the 5GC to the EPC) that is configured by the base station for the UE to connect to the target core network, RLC layer information configured by the base station for the UE, and the like.

The radio bearer in the fifth radio bearer information is used to carry a data packet after the UE is handed over to the target core network. For downlink transmission, the data packet is new data from the target core network. For uplink transmission, the data packet is new data received by the UE from an application layer.

Step 806: The UE sends a handover complete message to the base station, where this step is used by the UE to notify the base station that the handover is completed.

Step 807: Perform data transmission between the base station and the UE, where the data transmission includes uplink data and/or downlink data.

Downlink Data Transmission:

There are two types of downlink data that needs to be sent on the base station side. One is new data from the source core network and/or a downlink PDCP SDU that is not acknowledged by the UE for correct reception before the handover, which is referred to as fourth data; and the other is new data from the target core network, which is referred to as fifth data.

Two types of radio bearers are configured on the base station side: One is a radio bearer in fourth radio bearer information, and is used to carry the fourth data; and the other is a radio bearer in fifth radio bearer information and is used to carry the fifth data.

To ensure that the UE submits the data to an upper layer based on a sequence of data packets, the base station first sends the fourth data to the UE by using the radio bearer in the fourth radio bearer configuration information, and after the UE acknowledges that these data packets are correctly received, sends the fifth data to the UE by using the radio bearer in the fifth radio bearer configuration information.

Specifically, a process in which the base station determines whether the fourth data is correctly received by the UE includes:

In a possible implementation, the base station determines a receiving situation of the UE by using status information of an RLC layer. Further, after receiving a data packet from the base station, the UE sends RLC status information to the base station, where the RLC status information indicates the data packet received by the UE. After receiving the status information fed back by the UE, the base station can determine, based on an indication of the status information, whether the data packet is correctly received. For example, each data packet includes one identifier, and the identifier is used to indicate that the UE correctly receives the data packet sent by the base station.

In another possible implementation, the base station determines, by using an ACK at a MAC layer, whether the data packet is correctly received by the UE. Specifically, if the base station receives an ACK from the UE, the base station considers that the UE correctly receives the data packet; otherwise, the base station considers that the UE does not correctly receive the data packet.

In addition, whether the UE correctly receives a data packet of a DRB resource may be fed back in another manner. A specific implementation is not limited in this embodiment of this application.

After the UE is handed over to the target base station, a core network connected to the UE has changed. A specific method is the same as step 510 in Embodiment 2.

Uplink Data Transmission:

The UE resends, to the base station by using the radio bearer in the fourth radio bearer information, those PDCP SDUs that are not acknowledged by the base station for correct reception; and sends a new data packet from the upper layer to the base station by using the radio bearer in the fifth radio bearer information.

In a possible implementation, to ensure that the base station submits the data to an upper layer based on a sequence of data packets, the UE may first transmit the unsuccessfully sent PDCP SDUs on the radio bearer in the fourth radio bearer information, and after acknowledging that these data packets are correctly received by the base station, transmit the new data packet on the radio bearer in the fifth radio bearer information.

In another possible implementation, the UE transmits the unsuccessfully sent PDCP SDUs on the radio bearer in the fourth radio bearer information, and the UE may send an end packet on the radio bearer of the second radio bearer information. For example, the end packet is indicated by an SDAP layer, a PDCP layer, or an RLC layer, or further, may be indicated by a bit in a packet header of each of these layers, or may be indicated by a PDU that does not carry a payload and that is at each of these layers, or may be indicated by a control PDU of each of these layers.

Optionally, the UE may also transmit the new data packet on the radio bearer in the fifth radio bearer information at the same time, that is, the UE may transmit the new data packet on the radio bearer in the fifth radio bearer information without determining whether the data packets transmitted on the radio bearer in the fourth radio bearer information are correctly received by the base station.

Optionally, a process in which the base station submits the data packets received from the radio bearer in the fourth radio bearer information to the source core network, and submits the data packet received from the radio bearer in the fifth radio bearer information to the target core network specifically includes:

The base station may submit, to the target core network, the data packet received from the radio bearer in the fifth radio bearer information after all uplink data packets on the radio bearer in the fourth radio bearer information are submitted to the source core network.

Alternatively, the base station may submit the data packets from the two radio bearers respectively to the two core networks at the same time, but after completing the data packets received from the radio bearer in the fourth radio bearer information, the base station sends an end marker (end marker) packet to the source core network. The end marker packet is used to indicate an end of transmission of a data packet of an E-RAB, a PDU session, or a flow. After receiving the end marker packet, the source core network notifies the target core network that a data packet that is received from the base station and that is corresponding to the E-RAB, the PDU session, or the flow may be submitted to another entity (for example, a peer end that communicates with the UE).

Step 808: The base station sends a handover complete message to the target core network.

This step is the same as step 512 in Embodiment 2. Details are not described in this embodiment again.

Step 809: The target core network exchanges information with the source core network.

This step is the same as step 513 in Embodiment 2. This step is mainly used by the target core network to notify the source core network that the UE has been handed over and accessed the target core network.

Step 810: The source core network sends an end marker packet to the base station.

This step is the same as step 514 in Embodiment 2. Refer to the description of step 514 in Embodiment 2. Details are not described in this embodiment again.

According to the method provided in this embodiment, the base station establishes a communication connection to both the core networks EPC and 5GC by using a data transmission channel, and the base station may communicate with the EPC and the 5GC respectively by using two ports, so that the base station can also submit data packets from two radio bearers respectively to the two core networks at the same time, thereby improving data transmission efficiency.

Embodiment 4

This embodiment is specific to an application scenario in which a source base station and a target base station are a same base station in Embodiment 1 and Embodiment 2, for example, as shown in FIG. 9. A method is the same as the method for configuring radio resource bearer information for UE and data transmission in Embodiment 2, except that a target base station and a source base station in this embodiment are a same base station, that is, the base station in this embodiment has functions of a source base station and a target base station.

A difference between this embodiment and Embodiment 3 lies in that in Embodiment 3, a base station is connected to both a source core network and a target core network; while in this embodiment, in a handover process of UE, for the UE, the base station is connected to only one core network by using one data transmission channel.

Figure 10:
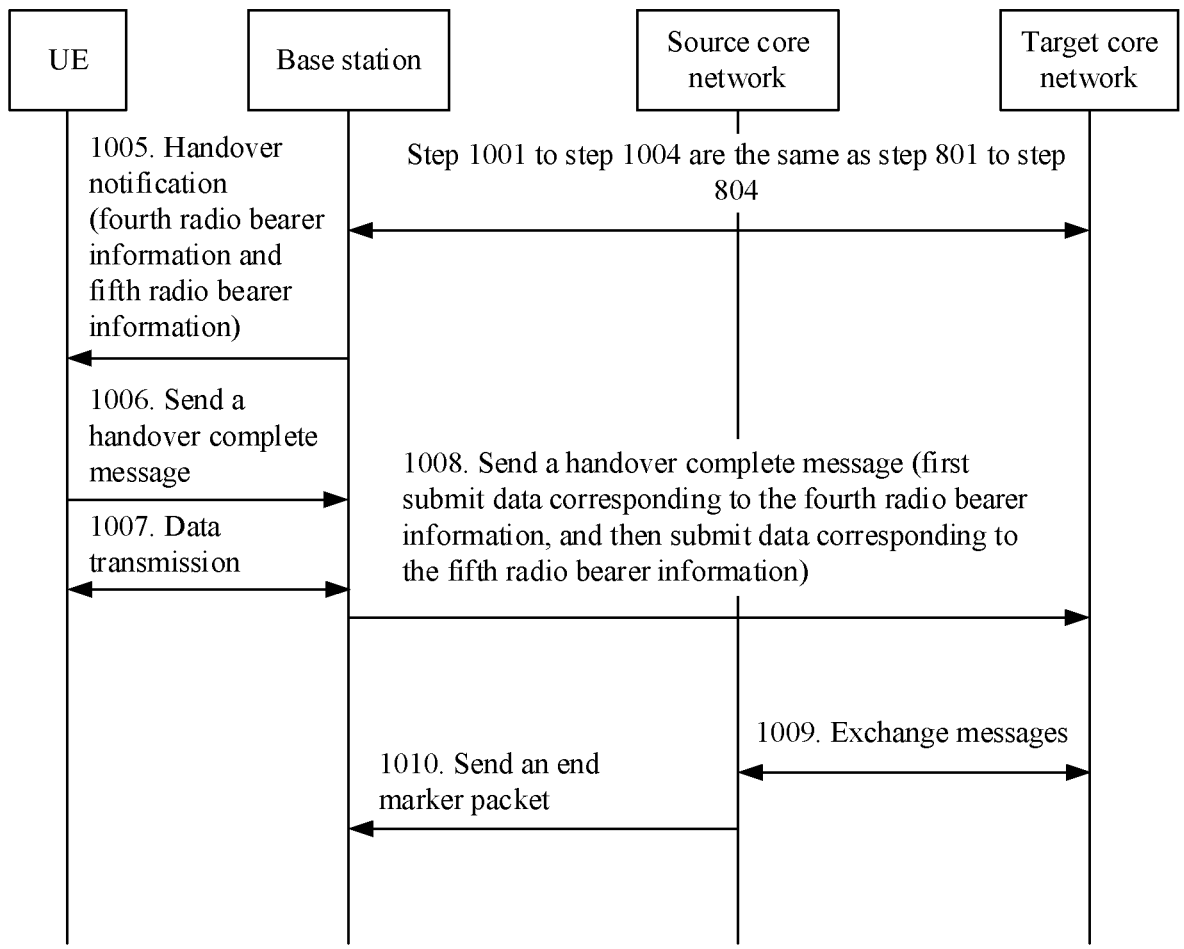
FIG. 10 is a signaling flowchart of still another data transmission method according to an embodiment of this application.

As shown in FIG. 10, the method includes the following steps.

Step 1001 to step 1004 are the same as step 801 to step 804 in Embodiment 3, and details are not described again.

Step 1005: The base station receives the handover request acknowledgment message sent by the target core network, and sends a handover notification to the UE.

The handover notification message includes fourth radio bearer information and/or fifth radio bearer information. Specifically, content of the fourth radio bearer information and the fifth radio bearer information is the same as that in Embodiment 3. Refer to the description in Embodiment 3. Details are not described in this embodiment again.

Step 1006: The UE sends a handover complete message to the base station, where this step is used by the UE to notify the base station that the handover is completed.

Step 1007: Perform data transmission between the base station and the terminal UE, where the data transmission includes uplink data and/or downlink data.

Downlink Data Transmission:

Same as Embodiment 4.

Uplink Data Transmission:

The UE resends, to the base station by using the radio bearer in the fourth radio bearer information, those PDCP SDUs that are not acknowledged by the base station for correct reception; and sends a new data packet from the upper layer to the base station by using the radio bearer in the fifth radio bearer information.

In a possible implementation, to ensure that the base station submits the data to an upper layer based on a sequence of data packets, the UE may first transmit the unsuccessfully sent PDCP SDUs on the radio bearer in the fourth radio bearer information, and after acknowledging that these data packets are correctly received by the base station, transmit the new data packet on the radio bearer in the fifth radio bearer information.

In another possible implementation, the UE transmits the unsuccessfully sent PDCP SDUs on the radio bearer in the fourth radio bearer information, and the UE may send an end marker on the radio bearer of the fourth radio bearer information. For example, the end marker is indicated by an SDAP layer, a PDCP layer, or an RLC layer, or further, may be indicated by a bit in a packet header of each of these layers, or may be indicated by a PDU that does not carry a payload and that is at each of these layers, or may be indicated by a control PDU of each of these layers.

Optionally, the UE may transmit the new data packet on the radio bearer in the fifth radio bearer information at the same time, that is, the UE may transmit the new data packet on the radio bearer in the fifth radio bearer information without determining whether the data packets transmitted on the radio bearer in the fifth radio bearer information are correctly received by the base station.

After the core network is switched, because the core network connected to the base station is changed to the target base station, data received by the base station from the radio bearer in the fourth radio bearer information needs to be specially processed. A processing method is the same as the processing method in Embodiment 2 except that only the second radio bearer information in Embodiment 2 needs to be replaced with the fourth radio bearer information in this embodiment.

In another processing method, the base station first receives the data on the radio bearer in the fourth radio bearer information, then submits all data of the radio bearer in the fourth radio bearer information to the source core network, and then submits the data of the radio bearer in the fifth radio bearer information to the target core network. After the base station submits all the data of the radio bearer in the fourth radio bearer information to the source core network, the base station sends a handover complete message to the target core network. Optionally, after the base station receives the end marker on the radio bearer in the fourth radio bearer information, the base station submits the data of the radio bearer in the fifth radio bearer information to the target core network.

In this method, because the base station has only one data transmission channel that is connected to the source core network or the target core network, before the UE is handed over, the base station performs data transmission with the source core network by using the data transmission channel. After the core network is switched, the base station establishes a connection to the target core network by using the data transmission channel, and performs data transmission.

Step 1008: The base station sends a handover complete message to the target core network.

This step is the same as step 512 in Embodiment 2. Details are not described in this embodiment again.

Step 1009: The target core network exchanges information with the source core network.

This step is the same as step 513 in Embodiment 2. This step is mainly used by the target core network to notify the source core network that the UE has been handed over and accessed the target core network.

Step 1010: The source core network sends an end marker packet to the base station.

This step is the same as step 514 in Embodiment 2. Refer to the description of step 514 in Embodiment 2. Details are not described in this embodiment again.

The following describes apparatus embodiments corresponding to the foregoing method embodiments.

Figure 11:
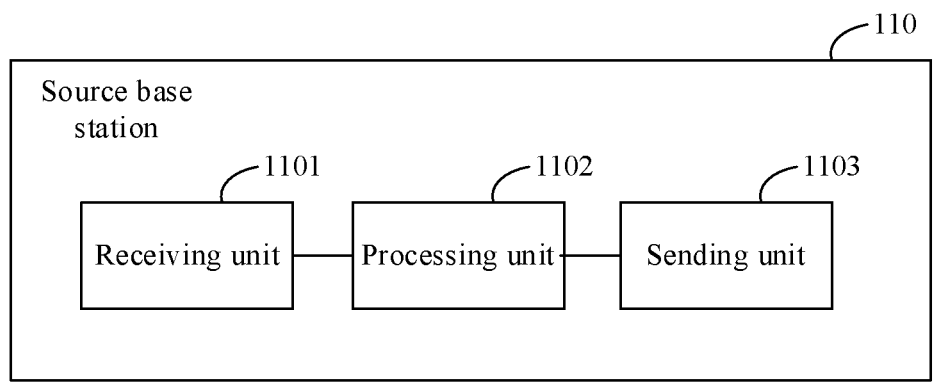
FIG. 11 is a schematic structural diagram of a source base station according to an embodiment of this application.

Referring to FIG. 11, an embodiment of this application provides a data transmission apparatus. Specifically, the data transmission apparatus is a source base station, and the source base station 110 includes a receiving unit 1101, a processing unit 1102, and a sending unit 1103. In addition, the data transmission apparatus may further include another functional module or unit, configured to perform the data transmission methods corresponding to FIG. 3, FIG. 4, FIG. 5, FIG. 8, and FIG. 10.

Further, the processing unit 1102 is configured to determine first data and a radio air interface protocol sequence number of a data unit used to carry the first data, where the first data includes data that is not acknowledged by a terminal for correct reception during data transmission between the source base station and the terminal.

The sending unit 1103 is configured to send the first data and the radio air interface protocol sequence number to a target base station.

A core network connected to the target base station is different from a core network connected to the source base station, and the source base station and the target base station are a source base station and a target base station of the terminal in a handover process between different core networks.

Optionally, in a implementation of this embodiment, the processing unit 1102 is further configured to determine second data, where the second data includes data that is received by the source base station from a source core network in a handover process of the terminal between core networks and that is to be sent to the terminal. The sending unit 1103 is further configured to send the second data to the target base station, so that the target base station continues to allocate, to the second data, a radio air interface protocol sequence number of a data unit of the second data based on the radio air interface protocol sequence number corresponding to the first data.

Optionally, in another implementation of this embodiment, the processing unit 1102 is further configured to: before the source base station sends the first data and the radio air interface protocol sequence number to the target base station, configure first radio bearer information for the terminal, where the first radio bearer information is used to establish a radio bearer between the target base station and the terminal. The sending unit 1103 is further configured to send the first radio bearer information to the target base station. The receiving unit 1101 is configured to receive an acknowledgment message fed back by the target base station, where the acknowledgment message is used to indicate second radio bearer information between the target base station and the terminal. The sending unit 1103 is further configured to send the second radio bearer information to the terminal.

Optionally, in still another specific implementation of this embodiment, the acknowledgment message is further used to indicate third radio bearer information, the third radio bearer information includes configuration information for configuring third data, and the third radio bearer information includes data received from a target core network of the target base station.

Optionally, in still another implementation of this embodiment, the sending unit 1103 is configured to send, to the target base station through a first tunnel, the data that is in the first data and that is not acknowledged by the terminal for correct reception and the radio air interface protocol sequence number.

Optionally, in still another implementation of this embodiment, the first data further includes an out-of-order data packet received by the source base station from the terminal, and the sending unit 1103 is configured to send, to the target base station through a second tunnel, the out-of-order data packet from the terminal in the first data and a radio air interface protocol sequence number corresponding to the out-of-order data packet.

Figure 12:
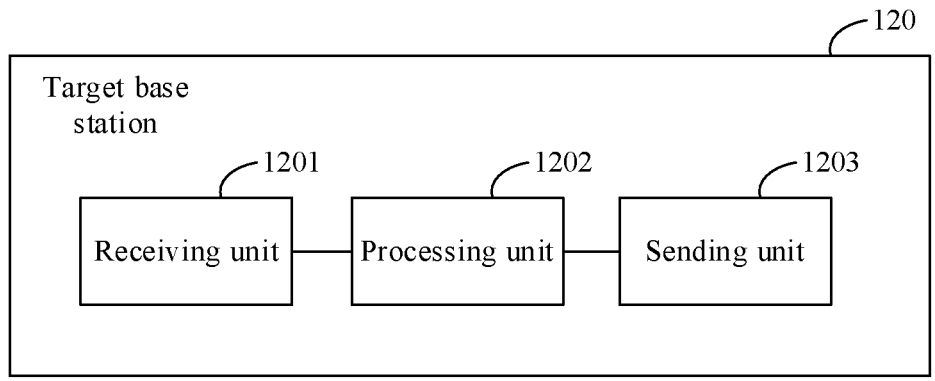
FIG. 12 is a schematic structural diagram of a target base station according to an embodiment of this application.

Referring to FIG. 12, an embodiment of this application provides a data transmission apparatus. Specifically, the data transmission apparatus is a target base station, and the target base station 120 includes a receiving unit 1201, a processing unit 1202, and a sending unit 1203. In addition, the data transmission apparatus may further include another functional module or unit, configured to perform the data transmission methods corresponding to FIG. 5, FIG. 8, and FIG. 10.

Specifically, the receiving unit 1201 is configured to receive first data and a radio air interface protocol sequence number from a source base station, where the first data includes data that is not acknowledged by a terminal for correct reception during data transmission between the source base station and the terminal, and the radio air interface protocol sequence number is a sequence number of a data unit that is determined by the source base station and that is used to carry the first data. The sending unit 1203 is configured to send the first data and the radio air interface protocol sequence number to the terminal.

A core network connected to the target base station is different from a core network connected to the source base station, and the source base station and the target base station are a source base station and a target base station of the terminal in a handover process between different core networks.

Optionally, in an implementation of this embodiment, the receiving unit 1201 is further configured to receive second data from the source base station, where the second data includes data that is received by the source base station from a source core network in a handover process of the terminal between core networks and that is to be sent to the terminal. The processing unit 1202 is configured to allocate, to the second data, a radio air interface protocol sequence number of a data unit of the second data based on the radio air interface protocol sequence number corresponding to the first data. The sending unit 1203 is further configured to send, to the terminal, the second data and the radio air interface protocol sequence number of the data unit of the second data.

Optionally, in another implementation of this embodiment, the receiving unit 1201 is further configured to: before receiving the first data and the radio air interface protocol sequence number from the source base station, receive first radio bearer information from the source base station, where the first radio bearer information is used to establish a radio bearer between the target base station and the terminal. The processing unit 1202 is further configured to determine second radio bearer information based on the first radio bearer information, and generate an acknowledgment message, where the acknowledgment message is used to indicate the second radio bearer information between the target base station and the terminal. The sending unit 1203 is further configured to send the acknowledgment message to the source base station.

Optionally, in still another implementation of this embodiment, the processing unit 1202 is further configured to determine third radio bearer information based on the first radio bearer information, where the third radio bearer information includes configuration information of a target core network connected to the target base station. The sending unit 1203 is further configured to send the third radio bearer information to the source base station by using the acknowledgment message.

Optionally, in still another implementation of this embodiment, the second radio bearer information includes a first radio bearer, for example, a first DRB. The sending unit 1203 is specifically configured to send, to the terminal by using the first radio bearer, the second data and the radio air interface protocol sequence number of the data unit of the second data.

Optionally, in still another implementation of this embodiment, the second radio bearer information includes a first radio bearer, for example, a first DRB. The sending unit 1203 is configured to send, to the terminal by using the first radio bearer, the second data and the radio air interface protocol sequence number of the data unit of the second data.

Optionally, in still another implementation of this embodiment, the processing unit 1202 is further configured to configure a second radio bearer, such as a second DRB, based on the third radio bearer information. The sending unit 1203 is further configured to send third data to the terminal by using the second radio bearer, where the third data is data received by the target core network located in the target base station.

Figure 13:
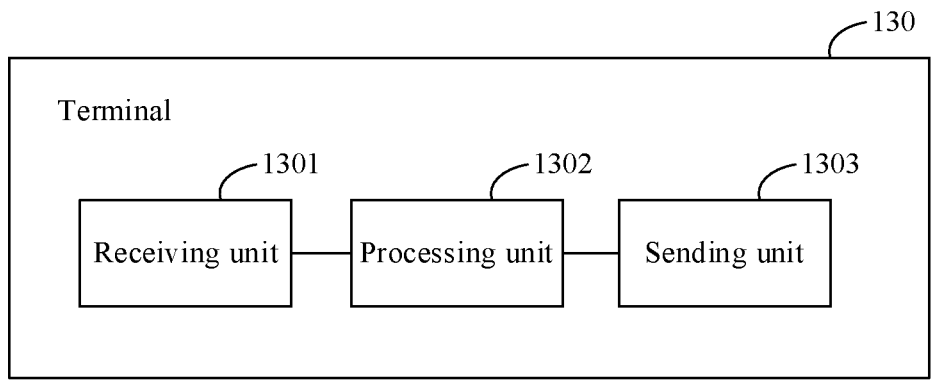
FIG. 13 is a schematic structural diagram of a terminal according to an embodiment of this application.

Referring to FIG. 13, an embodiment of this application provides a data transmission apparatus. Specifically, the data transmission apparatus is a terminal, and the terminal 130 includes a receiving unit 1301, a processing unit 1302, and a sending unit 1303. In addition, the data transmission apparatus may further include another functional module or unit, configured to perform the data transmission methods corresponding to FIG. 5, FIG. 8, and FIG. 10.

Specifically, the receiving unit 1301 is configured to receive first data and a radio air interface protocol sequence number from a target base station, where the first data includes data that is not acknowledged by the terminal for correct reception during data transmission between a source base station and the terminal, and the radio air interface protocol sequence number is a sequence number of a data unit that is determined by the source base station and that is used to carry the first data.

The processing unit 1302 is configured to sort, based on the radio air interface protocol sequence number, the first data and data cached on the terminal.

A core network connected to the target base station is different from a core network connected to the source base station, and the source base station and the target base station are a source base station and a target base station of the terminal in a handover process between different core networks.

Optionally, in an implementation of this embodiment, the receiving unit 1301 is further configured to receive, from the target base station, second data and a radio air interface protocol sequence number of a data unit of the second data, where the second data includes data that is received by the source base station from a source core network in a handover process of the terminal between core networks and that is to be sent to the terminal; and the processing unit 1302 is further configured to sort the second data based on the second data and the radio air interface protocol sequence number of the data unit of the second data.

Optionally, in another implementation of this embodiment, the receiving unit 1301 is further configured to receive, from the target base station, third data and a radio air interface protocol sequence number of a data unit of the third data, where the third data is data received from a target core network of the target base station; and the processing unit 1302 is further configured to sort the third data based on the radio air interface protocol sequence number of the data unit of the third data.

Optionally, in still another implementation of this embodiment, the receiving unit 1301 is further configured to: before the terminal receives the first data and the radio air interface protocol sequence number from the target base station, receive a handover notification message from the source base station, where the handover notification may be an RRC reconfiguration message, and the handover notification message includes an ID of a target cell that belongs to the target base station.

The processing unit 1302 is further configured to access the target cell based on the ID of the target cell, and send a handover complete message to the target base station.

Optionally, in still another implementation of this embodiment, the handover notification message further includes second radio bearer information, and the second radio bearer information includes a first radio bearer, for example, a first DRB, used to transmit the first data that is not acknowledged by the UE and that carries an SN number.

The receiving unit 1301 is configured to receive the first data and the radio air interface protocol sequence number of the data unit of the first data by using the first radio bearer.

Optionally, in still another implementation of this embodiment, the handover notification message further includes third radio bearer information, and the third radio bearer information includes a second radio bearer, for example, a second DRB, used to transmit a data packet after the handover, that is, third data.

The receiving unit 1301 is configured to receive the third data and the radio air interface protocol sequence number of the data unit of the third data by using the second radio bearer.

In a hardware embodiment, this application further provides a network device. The network device may be a base station, a terminal, or a core network device in the foregoing embodiment. The base station may be an LTE eNB connected to a core network EPC, or may be an eLTE eNB connected to a 5GC core network, or may be another source base station or target base station.

Figure 14:
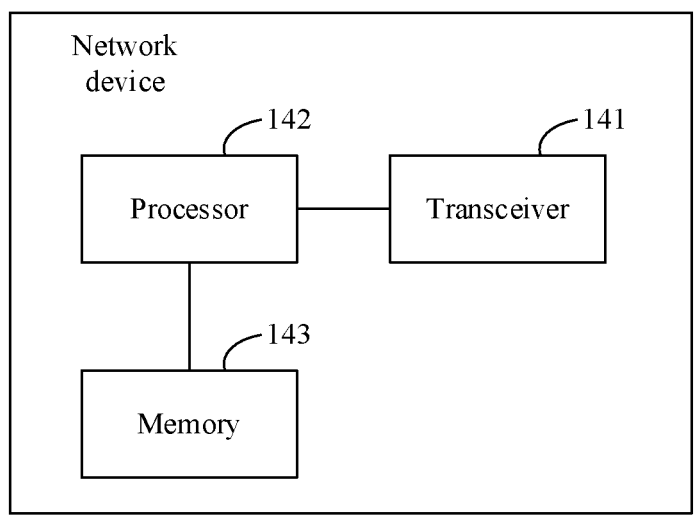
FIG. 14 is a schematic structural diagram of a network device according to an embodiment of this application.

Specifically, as shown in FIG. 14, the network device includes a transceiver 141, a processor 142, and a memory 143. The network device may further include more or fewer components, or combine some components, or have different component arrangements. This is not limited in this application.

The transceiver 141 is configured to receive and send data or a message, and perform data transmission with another node/device in a network. The transceiver 141 may include a transceiver module. The transceiver module may include a communications module such as a wireless local area network (WLAN) module, a Bluetooth module, or a baseband (baseband) module, and a radio frequency (RF) circuit corresponding to the communications module, and is configured to perform wireless local area network communication, Bluetooth communication, infrared communication, and/or cellular communications system communication, such as wideband code division multiple access (WCDMA) and/or high speed downlink packet access (HSDPA). The transceiver module is configured to control communication between all the components in the network device, and may support direct memory access.

The processor 142 is a control center of the network device, connects some or all parts of the network device by using various interfaces and lines, and performs various functions of the network device and/or processes data by running or executing a software program and/or a module stored in the memory 143 and invoking data stored in the memory 143.

Further, the processor 142 may include an integrated circuit (IC), for example, may include a single packaged IC, or may include a plurality of connected packaged ICs with a same function or different functions. For example, the processor may include only a central processing unit (CPU), or may be a combination of a GPU, a digital signal processor (DSP), and a control chip (such as a baseband chip) in the transceiver. In various implementations of this application, the CPU may be a single computing core, or may include a plurality of computing cores.

The memory 143 may include a volatile memory, for example, a random access memory (RAM), or may include a non-volatile memory, for example, a flash memory, a hard disk drive (HDD), or a solid-state drive (SSD). The memory may further include a combination of the foregoing types of memories. The memory may store a program or code, and the processor may implement a function of the network device by executing the program or the code.

In this embodiment, functions to be implemented by the transceiver 141 may be implemented by the receiving unit and the sending unit in the foregoing apparatus embodiments, or may be implemented by the transceiver 141 controlled by the processor 142. Functions to be implemented by each processing unit may be implemented by the processor 142.

In addition, this application further provides a computer storage medium, where the computer storage medium may store a program, and when the program is executed, some or all of the steps of the embodiments of the device upgrade method provided in this application may be performed. The storage medium may be non-transitory storage medium such as a magnetic disk, an optical disc, a read-only memory ROM, a random access memory RAM, or the like.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions, such as handover instructions. When a computer loads and executes the computer program, all or a part of the procedures or functions are generated according to the embodiments of this application. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer instructions may be transmitted from a network node, computer, server, or data center to another station, computer, or server in a wired or wireless manner.

The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive SSD), or the like.

In addition, the base station in the embodiments of this application may be a base transceiver station (BTS) in GSM or CDMA, or may be a NodeB in WCDMA, or may be an evolved NodeB (eNB/e-NodeB) in LTE, or an ng-eNB, or a gNB. This is not limited in this application.

The terminal in the embodiments of this application may be a device that provides a user with voice and/or data connectivity, a handheld device with a wireless connection function, or another processing device, such as a wireless terminal, connected to a wireless modem.

The wireless terminal may communicate with one or more nodes through a radio access network RAN. The wireless terminal may be a mobile terminal, such as a mobile phone (or referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal, a remote station, an access point, a remote terminal, an access terminal, a user terminal, a user agent, a user device, or a user equipment.

In the specification, claims, and accompanying drawings of this application, the terms "first", "second", and so on (if they exist) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

A person skilled in the art may clearly understand that, the technologies in the embodiments of this application may be implemented by software in addition to a necessary general hardware platform. Based on such an understanding, the technical solutions of this application essentially or the part contributing to the prior art may be implemented in a form of a software product. The software product is stored in a storage medium, such as a ROM/RAM, a magnetic disk, an optical disc and the like, and includes several instructions for instructing a computer device (which may be a personal computer, a server, or a network device and the like) to perform the methods described in the embodiments or some parts of the embodiments of the present invention.

For same or similar parts in the embodiments in this specification, mutual reference may be made between these embodiments. Especially, the embodiments related to the network device/node or apparatus device are basically similar to the method embodiments, and therefore are described briefly. For related parts, refer to descriptions in the method embodiments.

The foregoing descriptions are implementations of this application, but are not intended to limit the protection scope of this application.

What is claimed is:

1. A data transmission apparatus, wherein the apparatus is comprised in a source base station of a terminal in a handover process, and the apparatus comprises:
   a unit processor, configured to determine first data and a radio air interface protocol sequence number of a data unit used to carry the first data, wherein the first data comprises data that is not acknowledged by a terminal for correct reception during data transmission between the source base station and the terminal; and
   a transceiver unit, configured to send the first data and the radio air interface protocol sequence number to a target base station of the terminal in the handover process; wherein a target core network connected to the target base station is different from a source core network connected to the source base station;
   wherein the processor is further configured to determine second data, wherein the second data comprises data that is received by the source base station from the source core network and that is to be sent to the terminal; and
   the transceiver unit is further configured to send the second data to the target base station, so that the target base station continues to allocate, to the second data, a radio air interface protocol sequence number of a data unit of the second data based on the radio air interface protocol sequence number corresponding to the first data.

2. The apparatus according to claim 1, wherein:
   the processor is further configured to: before the source base station sends the first data and the radio air interface protocol sequence number to the target base station, configure first radio bearer information for the terminal, wherein the first radio bearer information is used to establish a radio bearer between the target base station and the terminal;
   the transceiver unit is further configured to send the first radio bearer information to the target base station;
   the transceiver unit is further configured to receive an acknowledgment message feedbacked by the target base station, wherein the acknowledgment message is used to indicate second radio bearer information between the target base station and the terminal; and
   the transceiver unit is further configured to send the second radio bearer information to the terminal.

3. The apparatus according to claim 2, wherein
   the acknowledgment message is further used to indicate third radio bearer information, the third radio bearer information includes configuration information for configuring third data, and the third data includes data received from the target core network of the target base station.

4. The apparatus according to claim 1, wherein
the transceiver unit is configured to send, to the target base station through a first tunnel, the data that is in the first data and that is not acknowledged by the terminal for correct reception and the radio air interface protocol sequence number.

5. The apparatus according to claim 1, wherein the first data further comprises an out-of-order data packet received by the source base station from the terminal; and
the transceiver unit is configured to send, to the target base station through a second tunnel, the out-of-order data packet from the terminal in the first data and a radio air interface protocol sequence number corresponding to the out-of-order data packet.

6. A data transmission apparatus, wherein the apparatus is applied to a target base station of a terminal in a handover process, and the apparatus comprises:
a transceiver unit, configured to receive first data and a radio air interface protocol sequence number from a source base station of the terminal in the handover process, wherein the first data comprises data that is not acknowledged by the terminal for correct reception during data transmission between the source base station and the terminal, and the radio air interface protocol sequence number is a sequence number of a data unit that is determined by the source base station and that is used to carry the first data, the transceiver unit being further configured to send the first data and the radio air interface protocol sequence number to the terminal; wherein a target core network connected to the target base station is different from a source core network connected to the source base station;
wherein the transceiver unit is further configured to receive second data from the source base station, wherein the second data comprises data that is received by the source base station from a source core network in a handover process of the terminal between core networks and that is to be sent to the terminal;
the processor is configured to continue to allocate, to the second data, a radio air interface protocol sequence number of a data unit of the second data based on the radio air interface protocol sequence number corresponding to the first data; and
the transceiver unit is further configured to send, to the terminal, the second data and the radio air interface protocol sequence number of the data unit of the second data.

7. The apparatus according to claim 6, wherein the second radio bearer information comprises a first radio bearer; and
the transceiver unit is configured to send, to the terminal by using the first radio bearer, the second data and the radio air interface protocol sequence number of the data unit of the second data.

8. The apparatus according to claim 6, wherein
the transceiver unit is further configured to: before receiving the first data and the radio air interface protocol sequence number from the source base station, receive first radio bearer information from the source base station, wherein the first radio bearer information is used to establish a radio bearer between the target base station and the terminal;
the processor is further configured to determine second radio bearer information based on the first radio bearer information, and generate an acknowledgment message, wherein the acknowledgment message is used to indicate the second radio bearer information between the target base station and the terminal; and
the transceiver unit is further configured to send the acknowledgment message to the source base station.

9. The apparatus according to claim 8, wherein
the processor is further configured to determine third radio bearer information based on the first radio bearer information, wherein the third radio bearer information comprises configuration information of a target core network connected to the target base station; and
the transceiver unit is further configured to send the third radio bearer information to the source base station by using the acknowledgment message.

10. The apparatus according to claim 9, wherein
the processor is further configured to configure a second radio bearer based on the third radio bearer information; and
the transceiver unit is further configured to send third data to the terminal by using the second radio bearer, wherein the third data is data received by the target core network located in the target base station.

11. The apparatus according to claim 8, wherein the second radio bearer information comprises a first radio bearer; and
the transceiver unit is configured to send, to the terminal by using the first radio bearer, the second data and the radio air interface protocol sequence number of the data unit of the second data.

12. A terminal, wherein the terminal comprises:
a transceiver unit, configured to receive first data and a radio air interface protocol sequence number from a target base station, wherein the first data comprises data that is not acknowledged by the terminal for correct reception during data transmission between a source base station and the terminal, and the radio air interface protocol sequence number is a sequence number of a data unit that is determined by the source base station and that is used to carry the first data; and
a processor, configured to sort, based on the radio air interface protocol sequence number, the first data and data cached on the terminal; wherein
a core network connected to the target base station is different from a core network connected to the source base station, and the source base station and the target base station are a source base station and a target base station of the terminal in a handover process between different core networks;
wherein the transceiver unit is further configured to receive, from the target base station, second data and a radio air interface protocol sequence number of a data unit of the second data, wherein the second data comprises data that is received by the source base station from a source core network in a handover process of the terminal between core networks and that is to be sent to the terminal and the radio air interface protocol sequence number of the data unit of the second data is allocated by the target base station based on the radio air interface protocol sequence number corresponding to the first data.

13. The terminal according to claim 12, wherein
the processor is further configured to sort the second data based on the second data and the radio air interface protocol sequence number of the data unit of the second data.

14. The terminal according to claim 12, wherein
the transceiver unit is further configured to receive, from the target base station, third data and a radio air interface protocol sequence number of a data unit of the third data, wherein the third data is data received from a target core network of the target base station; and the processor is further configured to sort the third data based on the radio air interface protocol sequence number of the data unit of the third data.

15. The terminal according to claim 14, wherein the handover notification message further comprises third radio bearer information, and the third radio bearer information comprises a second radio bearer; and the transceiver unit is configured to receive the third data and the radio air interface protocol sequence number of the data unit of the third data by using the second radio bearer.

16. The terminal according to claim 12, wherein the transceiver unit is further configured to: before the terminal receives the first data and the radio air interface protocol sequence number from the target base station, receive a handover notification message from the source base station, wherein the handover notification message comprises an identification (ID) of a target cell that accesses the target base station; and the processor is further configured to access the target cell based on the ID of the target cell, and send a handover complete message to the target base station.

17. The terminal according to claim 16, wherein the handover notification message further comprises second radio bearer information, and the second radio bearer information comprises a first radio bearer; and the transceiver unit is configured to receive the first data and the radio air interface protocol sequence number of the data unit of the first data by using the first radio bearer.

\* \* \* \* \*

UNITED STATES PATENT AND TRADEMARK OFFICE
CERTIFICATE OF CORRECTION

| | |
|---|---|
| PATENT NO. | : 11,711,731 B2 |
| APPLICATION NO. | : 17/186030 |
| DATED | : July 25, 2023 |
| INVENTOR(S) | : Xingxing Hu et al. |

It is certified that error appears in the above-identified patent and that said Letters Patent is hereby corrected as shown below:

In the Claims

In Column 44, Line 20, in Claim 1, after "a" delete "unit".

Signed and Sealed this
Third Day of October, 2023

Katherine Kelly Vidal
*Director of the United States Patent and Trademark Office*